United States Patent
Saliba et al.

(10) Patent No.: US 12,259,872 B2
(45) Date of Patent: Mar. 25, 2025

(54) COMPUTER SYSTEM AND METHOD FOR EVALUATING INTEGRITY AND PARSING OF A FILE SYSTEM AND PARSING IMPLEMENTATION

(71) Applicant: Magnet Forensics Inc., Waterloo (CA)

(72) Inventors: Jad John Saliba, Waterloo (CA); James David Schroering, Jr., Arvada, CO (US)

(73) Assignee: Magnet Forensics Inc., Waterloo (CA)

( * ) Notice: Subject to any disclaimer, the term of this patent is extended or adjusted under 35 U.S.C. 154(b) by 0 days.

(21) Appl. No.: 18/471,902

(22) Filed: Sep. 21, 2023

(65) Prior Publication Data
US 2024/0104085 A1    Mar. 28, 2024

Related U.S. Application Data

(60) Provisional application No. 63/410,472, filed on Sep. 27, 2022.

(51) Int. Cl.
*G06F 16/23*    (2019.01)
*G06F 16/13*    (2019.01)

(52) U.S. Cl.
CPC .......... *G06F 16/2365* (2019.01); *G06F 16/13* (2019.01)

(58) Field of Classification Search
None
See application file for complete search history.

(56) References Cited

U.S. PATENT DOCUMENTS

| | | | |
|---|---|---|---|
| 2016/0110120 A1* | 4/2016 | Pattabiraman | G06F 3/0613 711/156 |
| 2016/0110121 A1* | 4/2016 | Singh | G06F 3/0683 711/156 |
| 2017/0083537 A1* | 3/2017 | Vellore Ramesh | G06F 16/137 |
| 2018/0018218 A1* | 1/2018 | Rat | G06F 3/0619 |
| 2019/0212922 A1* | 7/2019 | Zhang | G06F 3/0688 |

OTHER PUBLICATIONS

European Patent Office, Extended European Search Report for EP Patent App. No. 23200090.1, Apr. 5, 2024.

* cited by examiner

*Primary Examiner* — Christopher J Raab
(74) *Attorney, Agent, or Firm* — Own Innovation; James W. Hinton; Daniel Biggs

(57) ABSTRACT

Provided are a system and method for evaluating integrity of a parsed file system. The system includes a processor and a memory communicatively connected to the processor and storing computer-executable instructions that cause the system to read an allocation tracker, create an allocated blocks collection of each block identifier within the allocation tracker indicated to be currently allocated, create an initially empty reference anomaly blocks collection, for each block of each file system object referenced by the file system object, determine that the associated block identifier is present in the allocated blocks collection or not, respectively remove the block identifier from the allocated blocks collection or add the block identifier to the reference anomaly blocks collection, determine that the allocated blocks collection and the reference anomaly blocks collection are empty or not empty and respectively indicate a successful evaluation or an unsuccessful evaluation.

19 Claims, 9 Drawing Sheets

COMPUTER SYSTEM AND METHOD FOR EVALUATING INTEGRITY AND PARSING OF A FILE SYSTEM AND PARSING IMPLEMENTATION

TECHNICAL FIELD

The following relates generally to file system parsing and more particularly to systems and methods for evaluating file system parsing.

INTRODUCTION

Parsing a file system to create a directory structure and obtain references to the allocated data within it is usually a straightforward process. However, evaluating whether such parsing has been done correctly or whether the implementation that created or last modified the file system operated according to the specification of the file system has performed correctly is often unfeasible. Often the foregoing unfeasibility results in a need to use secondary or even tertiary tools to also parse the file system and compare results.

Where a conventional application is used to parse a file system, an opportunity exists for errors during parsing, which may disadvantageously cause downstream effects. In digital forensics, an incorrectly parsed file system may disadvantageously lead to allocated files and/or directories not being present (and therefore not analyzed), and depending on the incorrect parsing, may further lead to certain areas of a target memory not being properly searched for unallocated data. While software may be tested heavily during development, it is not possible to test every possible permutation of user-provided data and the downstream effects of such errors therein. For example, some such user-provided data may indeed be corrupt, or the parsing of the file system in which the user-provided data is stored may be erroneous due to a change in code.

Accordingly, there is a need for an improved system and method for evaluating integrity of a file system and of a parsing implementation thereof that overcomes at least some of the disadvantages of existing systems and methods. There is a particular need for an improved such system and method that allows users to better verify parsing at the time the users perform the parsing.

SUMMARY

In an embodiment, there is provided a system for evaluating integrity and parsing of a file system and parsing implementation, the file system including file system objects, each file system object including at least one block, each block uniquely associated with a block identifier. The system includes a processor for evaluating the integrity and the parsing of the file system and a memory communicatively connected to the processor and storing computer-executable instructions that, when executed by the processor, cause the system to read an allocation tracker indicating allocation of each block identifier, create an allocated blocks collection of each block identifier within the allocation tracker that is indicated to be currently allocated, the allocated blocks collection including an allocated blocks array, create a reference anomaly blocks collection, the reference anomaly blocks collection including a reference anomaly blocks array, initialize each entry of the allocated blocks array to 0, initialize each entry of the reference anomaly blocks array to 0, create a reference differences collection, the reference differences collection including a reference differences array, for each file system object, for each block referenced by the file system object, determine that the associated block identifier is present in the allocated blocks collection or determine that the associated block identifier is not present in the allocated blocks collection, where the file system uses the associated block identifier to reference the block, assign a value of 1 to the corresponding entry in the allocated blocks collection, where the file system does not use the associated block identifier to reference the block, do not assign a value of 1 to the corresponding entry in the allocated blocks collection, for each file system object, for each block referenced by the file system object, increment the value of the corresponding entry in the reference anomaly blocks array by 1, for each entry in the reference differences array, assign a value equal to the value of the corresponding entry in the allocated blocks array minus the corresponding entry in the reference anomaly blocks array, determine that each entry in the reference differences array is equal to 0, or determine that at least one entry in the reference differences array is less than 0, where each entry in the reference differences array is equal to 0, indicate a successful evaluation, where at least one entry in the reference differences array is less than 0, determine that the corresponding entry in the allocated blocks array is equal to 0 or determine that the corresponding entry is equal to 1, where the corresponding entry is equal to 0, indicate an unsuccessful evaluation because the block associated with the corresponding entry is under-allocated, and where the corresponding entry is equal to 1, indicate an unsuccessful evaluation because the block associated with the corresponding entry is over-allocated.

The allocation tracker may include an allocation bitmap, the allocation bitmap including at least one bit, each bit corresponding to a block within the file system in a bijection. When a bit is set to true, the corresponding block may be considered allocated, and when a bit is set to false, the corresponding block may be considered unallocated.

The allocation tracker may include a file allocation table.

The file allocation table may include a singly-linked list including at least one entry.

Each entry may be 4 bytes in size.

Each file system object may be a file, a directory, or another structure that occupies blocks in the file system.

The processor may use a file system specification stored in the memory to reference blocks associated with each file system object.

Upon the successful evaluation, the processor may provide an indication that the file system is considered uncorrupted.

Upon the unsuccessful evaluation, the processor may provide an indication that the file system is considered corrupted and may perform post-processing based on the unsuccessful evaluation.

Upon the unsuccessful evaluation, the processor may perform post-processing including troubleshooting the file system or the processor.

Upon the unsuccessful evaluation, the processor may perform post-processing including direct parsing or raw carving on blocks remaining in the allocated blocks collection or the reference anomaly blocks collection.

Upon the unsuccessful evaluation, the processor may perform post-processing including generating and displaying a first notification indicating how much data in the file system appears to be corrupted.

The processor may generate and display the first notification indicating how much data in the file system appears to be corrupted by multiplying a count of apparently corrupted blocks by a size of the apparently corrupted blocks.

Upon the unsuccessful evaluation, the processor may perform post-processing including generating and displaying a second notification indicating which blocks are under-allocated or which blocks are over-allocated.

The processor may evaluate the integrity and the parsing of the file system and parsing implementation concurrently with parsing the file system.

The processor may evaluate the integrity and the parsing of the file system and parsing implementation subsequently to parsing the file system.

The system determining that the associated block identifier is present in the allocated blocks collection or determining that the associated block identifier is not present in the allocated blocks collection may include the system performing a depth-first search for the associated block identifier in the allocated blocks collection.

The system determining that the associated block identifier is present in the allocated blocks collection or determining that the associated block identifier is not present in the allocated blocks collection may include the system performing a breadth-first search for the associated block identifier in the allocated blocks collection.

The allocated blocks collection and the reference anomaly blocks collection may be implemented using a collection type that is thread-safe.

The processor may further parse the file system subsequently to evaluating the integrity and the parsing of the file system and parsing implementation.

In an embodiment, there is provided a method for evaluating integrity and parsing of a file system and parsing implementation implemented in a processor, the file system including file system objects, each file system object including at least one block, each block uniquely associated with a block identifier, the method including reading an allocation tracker indicating allocation of each block identifier, creating an allocated blocks collection of each block identifier within the allocation tracker that is indicated to be currently allocated, the allocated blocks collection including an allocated blocks array, creating a reference anomaly blocks collection, the reference anomaly blocks collection including a reference anomaly blocks array, initializing each entry of the allocated blocks array to 0, initializing each entry of the reference anomaly blocks array to 0, creating a reference differences collection, the reference differences collection including a reference differences array, for each file system object, for each block referenced by the file system object, determining that the associated block identifier is present in the allocated blocks collection or determining that the associated block identifier is not present in the allocated blocks collection, where the file system uses the associated block identifier to reference the block, assigning a value of 1 to the corresponding entry in the allocated blocks collection, where the file system does not use the associated block identifier to reference the block, not assigning a value of 1 to the corresponding entry in the allocated blocks collection, for each file system object, for each block referenced by the file system object, incrementing the value of the corresponding entry in the reference anomaly blocks array by 1, for each entry in the reference differences array, assigning a value equal to the value of the corresponding entry in the allocated blocks array minus the corresponding entry in the reference anomaly blocks array, determining that each entry in the reference differences array is equal to 0, or determining that at least one entry in the reference differences array is less than 0, where each entry in the reference differences array is equal to 0, indicating a successful evaluation, where at least one entry in the reference differences array is less than 0, determining that the corresponding entry in the allocated blocks array is equal to 0 or determining that the corresponding entry is equal to 1, where the corresponding entry is equal to 0, indicating an unsuccessful evaluation because the block associated with the corresponding entry is under-allocated, and where the corresponding entry is equal to 1, indicating an unsuccessful evaluation because the block associated with the corresponding entry is over-allocated.

The allocation tracker may include an allocation bitmap, the allocation bitmap including at least one bit, each bit corresponding to a block within the file system in a bijection. When a bit is set to true, the corresponding block may be considered allocated, and when a bit is set to false, the corresponding block may be considered unallocated.

The allocation tracker may include a file allocation table.

The file allocation table may include a singly-linked list including at least one entry.

Each entry may be 4 bytes in size.

The file system object may be a file, a directory, or another structure that occupies blocks in the file system.

The method may further include using a file system specification to reference blocks associated with each file system object.

The method may further include, upon the successful evaluation, providing an indication that the file system is considered uncorrupted.

The method may further include, upon the unsuccessful evaluation, providing an indication that the file system is considered corrupted and performing post-processing based on the unsuccessful evaluation.

The method may further include, upon the unsuccessful evaluation, performing post-processing including troubleshooting the file system or the processor.

The method may further include, upon the unsuccessful evaluation, performing post-processing including direct parsing or raw carving on blocks remaining in the allocated blocks collection and the reference anomaly blocks collection.

The method may further include, upon the unsuccessful evaluation, performing post-processing including generating and displaying a first notification indicating how much data in the file system appears to be corrupted.

Generating and displaying the first notification indicating how much data in the file system appears to be corrupted may include multiplying a count of apparently corrupted blocks by a size of the apparently corrupted blocks.

The method may further include, upon the unsuccessful evaluation, performing post-processing including generating and displaying a second notification indicating which blocks are under-allocated or which blocks are over-allocated.

The method for evaluating the integrity and the parsing of the file system and parsing implementation may be performed concurrently with parsing the file system.

The method for evaluating the integrity and the parsing of the file system and parsing implementation may be performed subsequently to parsing the file system.

Determining that the corresponding block identifier is present in the allocated blocks collection or determining that the associated block identifier is not present in the allocated blocks collection may include performing a depth-first search for the associated block identifier in the allocated blocks collection.

Determining that the associated block identifier is present in the allocated blocks collection or determining that the associated block identifier is not present in the allocated blocks collection may include performing a breadth-first search for the associated block identifier in the allocated blocks collection.

The allocated blocks collection and the reference anomaly blocks collection may be implemented using a collection type that is thread-safe.

The method may further include parsing the file system subsequently to evaluating the integrity and the parsing of the file system and parsing implementation.

In an embodiment, there is provided a device for evaluating integrity and parsing of a file system and parsing implementation, the file system including file system objects, each file system object including at least one block, each block uniquely associated with a block identifier, the device including a processor for evaluating the integrity and the parsing of the file system, a memory communicatively connected to the processor and storing computer-executable instructions that, when executed by the processor, cause the device to read an allocation tracker indicating allocation of each block identifier, create an allocated blocks collection of each block identifier within the allocation tracker that is indicated to be currently allocated, the allocated blocks collection including an allocated blocks array, create a reference anomaly blocks collection, the reference anomaly blocks collection including a reference anomaly blocks array, initialize each entry of the allocated blocks array to 0, initialize each entry of the reference anomaly blocks array to 0, create a reference differences collection, the reference differences collection including a reference differences array, for each file system object, for each block referenced by the file system object, determine that the associated block identifier is present in the allocated blocks collection or determine that the associated block identifier is not present in the allocated blocks collection, where the file system uses the associated block identifier to reference the block, assign a value of 1 to the corresponding entry in the allocated blocks collection, where the file system does not use the associated block identifier to reference the block, do not assign a value of 1 to the corresponding entry in the allocated blocks collection, for each file system object, for each block referenced by the file system object, increment the value of the corresponding entry in the reference anomaly blocks array by 1, for each entry in the reference differences array, assign a value equal to the value of the corresponding entry in the allocated blocks array minus the corresponding entry in the reference anomaly blocks array, determine that each entry in the reference differences array is equal to 0, or determine that at least one entry in the reference differences array is less than 0, where each entry in the reference differences array is equal to 0, indicate a successful evaluation, where at least one entry in the reference differences array is equal to 0, determine that the corresponding entry in the allocated blocks array is equal to 0 or determine that the corresponding entry is equal to 1, where the corresponding entry is equal to 0, indicate an unsuccessful evaluation because the block associated with the corresponding entry is under-allocated, and where the corresponding entry is equal to 1, indicate an unsuccessful evaluation because the block associated with the corresponding entry is over-allocated.

The allocation tracker may include an allocation bitmap, the allocation bitmap including at least one bit, each bit corresponding to a block within the file system in a bijection. When a bit is set to true, the corresponding block is considered allocated, and when a bit is set to false, the corresponding block is considered unallocated.

The allocation tracker may include a file allocation table.

The file allocation table may include a singly-linked list including at least one entry.

Each entry may be 4 bytes in size.

Each file system object may be a file, a directory, or another structure that occupies blocks in the file system.

The processor may use a file system specification stored in the memory to reference blocks associated with each file system object.

Upon the successful evaluation, the processor may provide an indication that the file system is considered uncorrupted.

Upon the unsuccessful evaluation, the processor may provide an indication that the file system is considered corrupted and may perform post-processing based on the unsuccessful evaluation.

Upon the unsuccessful evaluation, the processor may perform post-processing including troubleshooting the file system or the processor.

Upon the unsuccessful evaluation, the processor may perform post-processing including direct parsing or raw carving on blocks remaining in the allocated blocks collection or the reference anomaly blocks collection.

Upon the unsuccessful evaluation, the processor may perform post-processing including generating and displaying a first notification indicating how much data in the file system appears to be corrupted.

The processor may generate and display the first notification indicating how much data in the file system appears to be corrupted by multiplying a count of apparently corrupted blocks by a size of the apparently corrupted blocks.

Upon the unsuccessful evaluation, the processor may perform post-processing including generating and displaying a second notification indicating which blocks are under-allocated or which blocks are over-allocated.

The processor may evaluate the integrity and the parsing of the file system and parsing implementation concurrently with parsing the file system.

The processor may evaluate the integrity and the parsing of the file system and parsing implementation subsequently to parsing the file system.

The device determining that the associated block identifier is present in the allocated blocks collection or determining that the associated block identifier is not present in the allocated blocks collection may include the device performing a depth-first search for the associated block identifier in the allocated blocks collection.

The device determining that the associated block identifier is present in the allocated blocks collection or determining that the associated block identifier is not present in the allocated blocks collection may include the device performing a breadth-first search for the associated block identifier in the allocated blocks collection.

The allocated blocks collection and the reference anomaly blocks collection may be implemented using a collection type that is thread-safe.

The processor may further parse the file system subsequently to evaluating the integrity and the parsing of the file system and parsing implementation.

In an embodiment, there is provided a system for evaluating integrity and parsing of a file system and parsing implementation, the file system including file system objects, each file system object including at least one block, each block uniquely associated with a block identifier. The system includes a processor for evaluating the integrity and the parsing of the file system and a memory communicatively connected to the processor and storing computer-executable instructions that, when executed by the processor, cause the system to read an allocation tracker indicating allocation of each block identifier, create an allocated blocks collection of each block identifier within the allocation tracker that is indicated to be currently allocate, create a reference anomaly blocks collection, the reference anomaly blocks collection being initially empty, for each file system object, for each block referenced by the file system object, determine that the associated block identifier is present in the allocated blocks collection or determine that the associated block identifier is not present in the allocated blocks collection, where the associated block identifier is present in the allocated blocks collection, remove the block identifier from the allocated blocks collection, where the associated block identifier is not present in the allocated blocks collection, add the block identifier to the reference anomaly blocks collection, determine that the allocated blocks collection and the reference anomaly blocks collection are empty, or determine that the allocated blocks collection or the reference anomaly blocks collection is not empty, where the allocated blocks collection and the reference anomaly blocks collection are empty, indicate a successful evaluation, and where the allocated blocks collection or the reference anomaly blocks collection is not empty, indicate an unsuccessful evaluation.

The allocation tracker may include an allocation bitmap, the allocation bitmap including at least one bit, each bit corresponding to a block within the file system in a bijection. When a bit is set to true, the corresponding block may be considered allocated, and when a bit is set to false, the corresponding block may be considered unallocated.

The allocation tracker may include a file allocation table.

The file allocation table may include a singly-linked list including at least one entry.

Each entry may be 4 bytes in size.

Each file system object may be a file, a directory, or another structure that occupies blocks in the file system.

The processor may use a file system specification stored in the memory to reference blocks associated with each file system object.

Upon the successful evaluation, the processor may provide an indication that the file system is considered uncorrupted.

Upon the unsuccessful evaluation, the processor may provide an indication that the file system is considered corrupted and may perform post-processing based on the unsuccessful evaluation.

Upon the unsuccessful evaluation, the processor may perform post-processing including troubleshooting the file system or the processor.

Upon the unsuccessful evaluation, the processor may perform post-processing including direct parsing or raw carving on blocks remaining in the allocated blocks collection or the reference anomaly blocks collection.

Upon the unsuccessful evaluation, the processor may perform post-processing including generating and displaying a first notification indicating how much data in the file system appears to be corrupted.

The processor may generate and display the first notification indicating how much data in the file system appears to be corrupted by multiplying a count of apparently corrupted blocks by a size of the apparently corrupted blocks.

Upon the unsuccessful evaluation, the processor may perform post-processing including generating and displaying a second notification indicating which blocks remain in the allocated blocks collection or the reference anomaly blocks collection.

The processor may evaluate the integrity and the parsing of the file system and parsing implementation concurrently with parsing the file system.

The processor may evaluate the integrity and the parsing of the file system and parsing implementation subsequently to parsing the file system.

The system determining that the associated block identifier is present in the allocated blocks collection or determining that the associated block identifier is not present in the allocated blocks collection may include the system performing a depth-first search for the associated block identifier in the allocated blocks collection.

The system determining that the associated block identifier is present in the allocated blocks collection or determining that the associated block identifier is not present in the allocated blocks collection may include the system performing a breadth-first search for the associated block identifier in the allocated blocks collection.

The allocated blocks collection and the reference anomaly blocks collection may be implemented using a collection type that is thread-safe.

The processor may further parse the file system concurrently with, previously to, or subsequently to evaluating the integrity and the parsing of the file system and parsing implementation.

In an embodiment, there is provided a method for evaluating integrity and parsing of a file system and parsing implementation implemented in a processor, the file system including file system objects, each file system object including at least one block, each block uniquely associated with a block identifier. The method includes reading an allocation tracker indicating allocation of each block identifier, creating an allocated blocks collection of each block identifier within the allocation tracker that is indicated to be currently allocated, creating a reference anomaly blocks collection, the reference anomaly blocks collection being initially empty, for each file system object, for each block referenced by the file system object, determining that the associated block identifier is present in the allocated blocks collection or determining that the associated block identifier is not present in the allocated blocks collection, where the associated block identifier is present in the allocated blocks collection, removing the block identifier from the allocated blocks collection, where the associated block identifier is not present in the allocated blocks collection, adding the block identifier to the reference anomaly blocks collection, determining that the allocated blocks collection and the reference anomaly blocks collection are empty, or determining that the allocated blocks collection or the reference anomaly blocks collection is not empty, where the allocated blocks collection and the reference anomaly blocks collection are empty, indicating a successful evaluation, and where the allocated blocks collection or the reference anomaly blocks collection is not empty, indicating an unsuccessful evaluation.

The allocation tracker may include an allocation bitmap, the allocation bitmap including at least one bit, each bit corresponding to a block within the file system in a bijection. When a bit is set to true, the corresponding block may be considered allocated, and when a bit is set to false, the corresponding block may be considered unallocated.

The allocation tracker may include a file allocation table.

The file allocation table may include a singly-linked list including at least one entry.

Each entry may be 4 bytes in size.

The file system object may be a file, a directory, or another structure that occupies blocks in the file system.

The method may further include using a file system specification to reference blocks associated with each file system object.

The method may further include, upon the successful evaluation, providing an indication that the file system is considered uncorrupted.

The method may further include, upon the unsuccessful evaluation, providing an indication that the file system is considered corrupted and performing post-processing based on the unsuccessful evaluation.

The method may further include, upon the unsuccessful evaluation, performing post-processing including troubleshooting the file system or the processor.

The method may further include, upon the unsuccessful evaluation, performing post-processing including direct parsing or raw carving on blocks remaining in the allocated blocks collection and the reference anomaly blocks collection.

The method may further include, upon the unsuccessful evaluation, performing post-processing including generating and displaying a first notification indicating how much data in the file system appears to be corrupted.

Generating and displaying the first notification indicating how much data in the file system appears to be corrupted may include multiplying a count of apparently corrupted blocks by a size of the apparently corrupted blocks.

The method may further include, upon the unsuccessful evaluation, performing post-processing including generating and displaying a second notification indicating which blocks remain in the allocated blocks collection or the reference anomaly blocks collection.

The method for evaluating the integrity and the parsing of the file system and parsing implementation may be performed concurrently with parsing the file system.

The method for evaluating the integrity and the parsing of the file system and parsing implementation may be performed subsequently to parsing the file system.

Determining that the corresponding block identifier is present in the allocated blocks collection or determining that the associated block identifier is not present in the allocated blocks collection may include performing a depth-first search for the associated block identifier in the allocated blocks collection.

Determining that the associated block identifier is present in the allocated blocks collection or determining that the associated block identifier is not present in the allocated blocks collection may include performing a breadth-first search for the associated block identifier in the allocated blocks collection.

The allocated blocks collection and the reference anomaly blocks collection may be implemented using a collection type that is thread-safe.

The method may further include parsing the file system concurrently with, previously to, or subsequently to evaluating the integrity and the parsing of the file system and parsing implementation.

In an embodiment, there is provided a device for evaluating integrity and parsing of a file system and parsing implementation, the file system including file system objects, each file system object including at least one block, each block uniquely associated with a block identifier. The device includes a processor for evaluating the integrity and the parsing of the file system and a memory communicatively connected to the processor and storing computer-executable instructions that, when executed by the processor, cause the device to read an allocation tracker indicating allocation of each block identifier, create an allocated blocks collection of each block identifier within the allocation tracker that is indicated to be currently allocated, create a reference anomaly blocks collection, the reference anomaly blocks collection being initially empty, for each file system object, for each block referenced by the file system object, determine that the associated block identifier is present in the allocated blocks collection or determine that the associated block identifier is not present in the allocated blocks collection, where the associated block identifier is present in the allocated blocks collection, remove the block identifier from the allocated blocks collection, where the associated block identifier is not present in the allocated blocks collection, add the block identifier to the reference anomaly blocks collection, determine that the allocated blocks collection and the reference anomaly blocks collection are empty, or determine that the allocated blocks collection or the reference anomaly blocks collection is not empty, where the allocated blocks collection and the reference anomaly blocks collection are empty, indicate a successful evaluation, and where the allocated blocks collection or the reference anomaly blocks collection is not empty, indicate an unsuccessful evaluation.

The allocation tracker may include an allocation bitmap, the allocation bitmap including at least one bit, each bit corresponding to a block within the file system in a bijection. When a bit is set to true, the corresponding block may be considered allocated, and when a bit is set to false, the corresponding block may be considered unallocated.

The allocation tracker may include a file allocation table.

The file allocation table may include a singly-linked list including at least one entry.

Each entry may be 4 bytes in size.

Each file system object may be a file, a directory, or another structure that occupies blocks in the file system.

The processor may use a file system specification stored in the memory to reference blocks associated with each file system object.

Upon the successful evaluation, the processor may provide an indication that the file system is considered uncorrupted.

Upon the unsuccessful evaluation, the processor may provide an indication that the file system is considered corrupted and may perform post-processing based on the unsuccessful evaluation.

Upon the unsuccessful evaluation, the processor may perform post-processing including troubleshooting the file system or the processor.

Upon the unsuccessful evaluation, the processor may perform post-processing including direct parsing or raw carving on blocks remaining in the allocated blocks collection or the reference anomaly blocks collection.

Upon the unsuccessful evaluation, the processor may perform post-processing including generating and displaying a first notification indicating how much data in the file system appears to be corrupted.

The processor may generate and display the first notification indicating how much data in the file system appears to be corrupted by multiplying a count of apparently corrupted blocks by a size of the apparently corrupted blocks.

Upon the unsuccessful evaluation, the processor may perform post-processing including generating and displaying a second notification indicating which blocks remain in the allocated blocks collection or the reference anomaly blocks collection.

The processor may evaluate the integrity and the parsing of the file system and parsing implementation concurrently with parsing the file system.

The processor may evaluate the integrity and the parsing of the file system and parsing implementation subsequently to parsing the file system.

The system determining that the associated block identifier is present in the allocated blocks collection or determining that the associated block identifier is not present in the allocated blocks collection may include the system performing a depth-first search for the associated block identifier in the allocated blocks collection.

The system determining that the associated block identifier is present in the allocated blocks collection or determining that the associated block identifier is not present in the allocated blocks collection may include the system performing a breadth-first search for the associated block identifier in the allocated blocks collection.

The allocated blocks collection and the reference anomaly blocks collection may be implemented using a collection type that is thread-safe.

The processor may further parse the file system concurrently with, previously to, or subsequently to evaluating the integrity and the parsing of the file system and parsing implementation.

In an embodiment, there is provided a system for evaluating integrity and parsing of a file system and parsing implementation, the file system including file system objects, each file system object including at least one block, each block uniquely associated with a block identifier. The system includes a processor for evaluating the integrity and the parsing of the file system and a memory communicatively connected to the processor and storing computer-executable instructions that, when executed by the processor, cause the system to create an allocated blocks collection of each block identifier indicated to be currently allocated, create a reference anomaly blocks collection, the reference anomaly blocks collection being initially empty, for each file system object, for each block referenced by the file system object, where the associated block identifier is present in the allocated blocks collection, remove the block identifier from the allocated blocks collection, for each file system object, for each block referenced by the file system object, where the associated block identifier is not present in the allocated blocks collection, add the block identifier to the reference anomaly blocks collection, and determine that the allocated blocks collection and the reference anomaly blocks collection are empty and indicate a successful evaluation.

In an embodiment, there is provided a system for evaluating integrity and parsing of a file system and parsing implementation, the file system including file system objects, each file system object including at least one block, each block uniquely associated with a block identifier. The system includes a processor for evaluating the integrity and the parsing of the file system and a memory communicatively connected to the processor and storing computer-executable instructions that, when executed by the processor, cause the system to create an allocated blocks collection of each block identifier indicated to be currently allocated, create a reference anomaly blocks collection, the reference anomaly blocks collection being initially empty, for each file system object, for each block referenced by the file system object, where the associated block identifier is present in the allocated blocks collection, remove the block identifier from the allocated blocks collection, for each file system object, for each block referenced by the file system object, where the associated block identifier is not present in the allocated blocks collection, add the block identifier to the reference anomaly blocks collection, and determine that the allocated blocks collection or the reference anomaly blocks collection is not empty and indicate an unsuccessful evaluation.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 2:
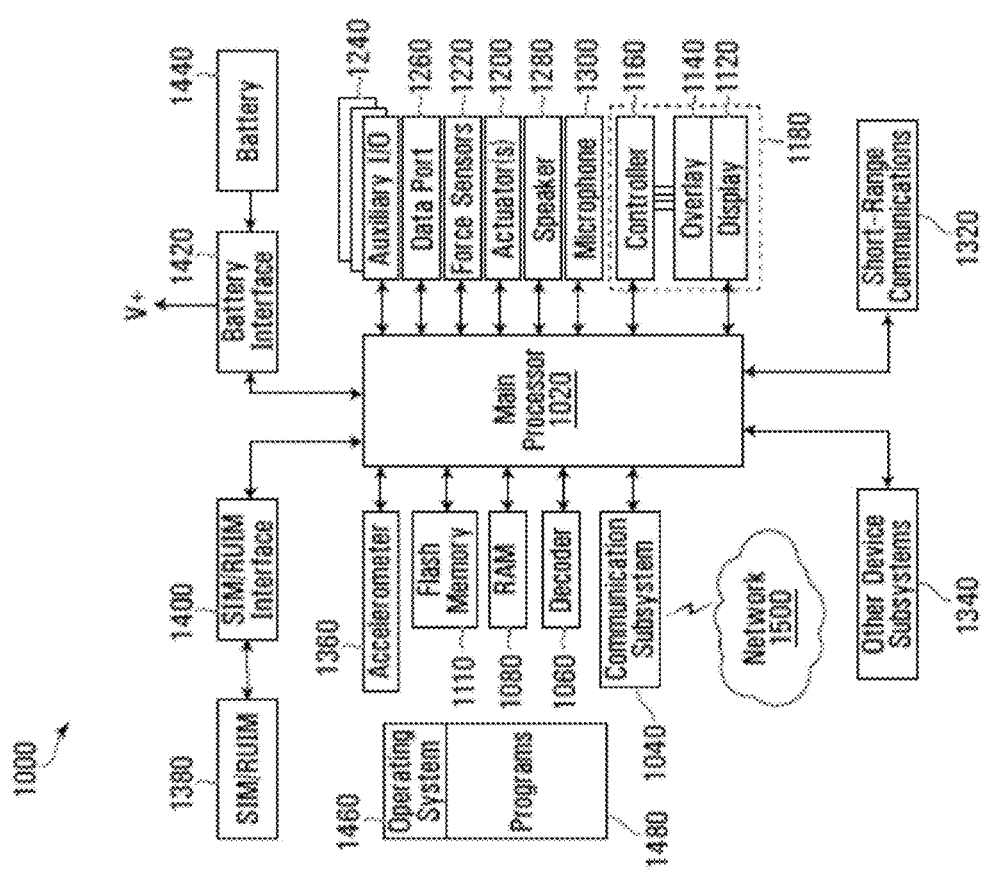
FIG. 2 is a block diagram of a computing device of the present disclosure, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each including at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistant, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of the single device/article. Similarly, where more than one device or article is described herein (whether or not they cooperate), it will be readily apparent that a single device/article may be used in place of the more than one device or article.

The following relates generally to a system and method for file system management and data validation, and more particularly to a system and method for evaluating integrity and parsing of a file system and parsing implementation including evaluating parsing of the file system.

The present disclosure may advantageously use elements common to each of a variety of disparate file systems to inform systems and methods for evaluating the parsing thereof. Specifically, through the use of an allocation tracker common to many commercially widespread file systems, each block referenced by each file system object may be compared against a collection of block identifiers corresponding to blocks indicated as allocated to determine whether any blocks are improperly indicated as allocated or improperly indicated as unallocated.

Conventional approaches to parsing a file system and evaluating the parsing of the file system may not succeed in revealing blocks that are improperly indicated as allocated or improperly indicated as unallocated despite being referenced by file system objects (e.g., files). Accordingly, errors within the parsing of the file system and/or within the file system itself may not be revealed through conventional approaches until a specific situation is encountered within data from the file system.

The goal of the present system and method is to utilize the contents and structures of the file system to evaluate not only the integrity of the file system but that of the parsing implementation.

Through the use of common elements within file systems to create a process that is not specific to a particular file system, the present disclosure may advantageously be used generally across any file system as long as the file system includes certain specific elements (however implemented), such as the allocation tracker.

As used herein, the term "block" is used to refer to the smallest addressable unit of data in a file system. While the name may vary from file system to file system (e.g. in FAT32, such units of data are referred to as a "cluster"), the function and purpose is the same across file systems.

As used herein, the term "allocation tracker" refers to a structure or method for tracking, present in each file system, which blocks in the file system are currently allocated. The allocation tracker may be an allocation bitmap stored in a series of bits, each representing a single block within the file system in a bijection. In an example, if the bit is set (true), the block is allocated, otherwise the block is considered unallocated.

The "allocation bitmap" is typically a series of bits as described where true=allocated and false=unallocated. Other allocation trackers may be used in addition to or instead of the allocation bitmap. The other allocation trackers include a file allocation table (FAT) to indicate which blocks or clusters are allocated.

The FAT may be a singly-linked list. Each entry of the singly-linked list FAT may represent whether a block or cluster is allocated and further which block or cluster is next in the singly-linked list, if any. Each entry in the singly-linked list may be 4 bytes in size.

As used herein, the term "file system object" is used to refer to a file, directory, or other structure that occupies blocks in the file system.

A file system that is completely clean (i.e., the integrity of the file system is good) may be incorrectly parsed because the parsing method itself has an error. Similarly, a file system may have its integrity compromised, and a correctly performing parsing algorithm may detect such compromised integrity. In either case, the present improved systems and methods for evaluating the parsing of such a file system would indicate an error because results of the verification would also fail. In practice, a tool may advantageously be used to verify in real time (using live user data) whether there are indications that the parsing operation wasn't completely successful (e.g., due to bad parsing code, bad file system integrity, or both).

Figure 1:
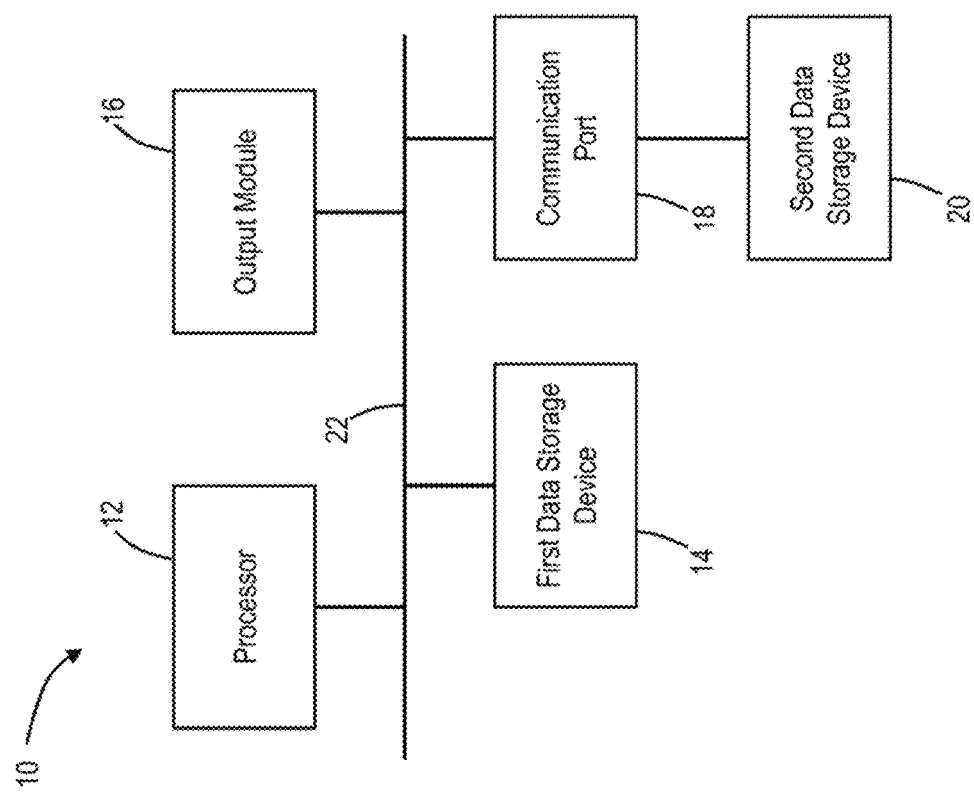
FIG. 1 is a block diagram of a computer system for evaluating integrity and parsing of a file system and parsing implementation, according to an embodiment.

Referring now to FIG. 1, shown therein is a system 10 for evaluating integrity and parsing of a file system, according to an embodiment.

The system 10 includes a processor 12, a first data storage device 14, an output module 16, a communication port 18 and a second data storage device 20 coupled to the communication port 18. In this embodiment, the various components 12, 14, 16, 18 of the system 10 are operatively coupled using a system bus 22.

The system 10 may be various electronic devices such as personal computers, networked computers, portable computers, portable electronic devices, personal digital assistants, laptops, desktops, mobile phones, smart phones, tablets, and so on.

In some examples, the first data storage device 14 may be a hard disk drive, a solid-state drive, or any other form of suitable data storage device and/or memory that may be used in various electronic devices. The data storage device 14 may have various data stored thereon. Generally, the data stored on the data storage device 14 includes a file system (not shown) whose integrity and parsing implementation is to be evaluated. The data may include data that may be of forensic value to a digital forensic investigation and from which a forensic image can be generated and acquired for investigation or from which forensic artifacts and other data items can be collected for further investigation.

In the embodiment as shown, another data storage device in addition to the first data storage device 14, namely the second data storage device 20, is provided. The second data storage device 20 may be used to store computer-executable instructions that can be executed by the processor 12 to configure the processor 12 to evaluate parsing of a file system (not shown) stored in the data storage device 14. The second data storage device 20 may be used to store computer-executable instructions that can be executed by the processor 12 to configure the processor 12 to evaluate parsing of a file system (not shown) acquired from the first data storage device 14 and stored in the second data storage device 20.

It should be noted that it is not necessary to provide a second data storage device 20. In an embodiment, the instructions are stored in the first data storage device 14 or any other data storage device.

In some cases, the first data storage device 14 may be a data storage device external to the system 10 or processor 12. For example, the first data storage device 14 may be a data storage component of an external computing device (e.g., a mobile phone or a laptop computer) that is being forensically investigated. Such device may be referred to as a "target device". In such cases, the processor 12 may be configured to execute computer-executable instructions (stored in second data storage device 20) to acquire a forensic image of the first data storage device 14 and store the forensic image in the second data storage device 20.

The processor 12 may be configured to provide a user interface to the output module 16. The output module 16 may be a suitable display device (e.g., a monitor) coupled to the processor 12. The user interface allows the processor 12 to solicit input from a user regarding various types of operations to be performed by the processor 12. The user interface also allows for the display of various output data and determinations, such as a determination of the status of an allocated blocks collection (not shown) and a reference anomaly blocks collection (not shown), as generated by the processor 12.

The system 10 may be a purpose-built machine designed specifically for evaluating the integrity and parsing of a file system.

The system 10 may be a server computer, desktop computer, notebook computer, tablet, PDA, smartphone, or another computing device. The system 10 may include a connection with a network such as a wired or wireless connection to the Internet. In some cases, the network may include other types of computer or telecommunication networks. The system 10 may include one or more of a memory, a secondary storage device, a processor, an input device, a display device, and an output device. Memory may include random access memory (RAM) or similar types of memory. Also, memory may store one or more applications for execution by processor. Applications may correspond with software modules including computer executable instructions to perform processing for the functions described below. Secondary storage device may include a hard disk drive, floppy disk drive, CD drive, DVD drive, Blu-ray drive, or other types of non-volatile data storage. Processor 12 may execute applications, computer readable instructions or programs. The applications and computer readable instructions or programs may be stored in memory or in secondary storage or may be received from the Internet or other network. The input device may include any device for entering information into system 10. For example, the input device may be a keyboard, keypad, cursor-control device, touchscreen, camera, or microphone. The display device may include any type of device for presenting visual information. For example, the display device may be a computer monitor, a flat-screen display, a projector, or a display panel. The output device may include any type of device for presenting a hard copy of information, such as a printer for example. The output device may also include other types of output devices such as speakers, for example. In some cases, system 10 may include multiple of any one or more of processors, applications, software modules, secondary storage devices, network connections, input devices, output devices, and display devices.

Although system 10 is described with various components, one skilled in the art will appreciate that the system 10 may in some cases contain fewer, additional or different components. In addition, although aspects of an implementation of the system 10 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the system 10 and/or processor 12 to perform a particular method.

In the description that follows, devices such as system 10 are described performing certain acts. It will be appreciated that any one or more of these devices may perform an act automatically or in response to an interaction by a user of that device. That is, the user of the device may manipulate one or more input devices (e.g., a touchscreen, a mouse, a button) causing the device to perform the described act. In many cases, this aspect may not be described below, but it will be understood.

As an example, a user using the system 10 may manipulate one or more input devices (not shown; e.g., a mouse and a keyboard) to interact with a user interface displayed on a display of the system 10. In some cases, the system 10 may generate and/or receive a user interface from the network (e.g., in the form of a webpage). Alternatively, or in addition, a user interface may be stored locally at a device (e.g., a cache of a webpage or a mobile application).

In response to receiving information, the system 10 may store the information in a storage database (not shown). The storage database may correspond with secondary storage of the system 10. Generally, the storage database may be any suitable storage device such as a hard disk drive, a solid state drive, a memory card, or a disk (e.g. CD, DVD, Blu-ray). Also, the storage database may be locally connected with the system 10. In some cases, the storage database may be located remotely from the system 10 and may be accessible to the system 10 across a network, for example. In some cases, the storage database may include one or more storage devices located at a networked cloud storage provider.

Referring now to FIG. 2, shown therein is a block diagram of a computing device 1000, according to an embodiment. The computing device 1000 may be the computer system 10 of FIG. 1. Similarly named or functioning components of computing device 1000 may correspond to components of computer system 10 (e.g. processor 1020 may correspond to the processor 12).

The computing device 1000 includes multiple components such as a processor 1020 that controls the operations of the computing device 1000. Communication functions, including data communications, voice communications, or both may be performed through a communication subsystem 1040. Data received by the computing device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The computing device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1110, a display 1120 (e.g. with a touch-sensitive overlay 1140 connected to an electronic controller 1160 that together include a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a computing device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the computing device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1110 or performed using other techniques.

The computing device 1000 also includes an operating system 1460 and software components 1480 that are executed by the processor 1020 and which may be stored in a persistent data storage device such as the flash memory 1110. Additional applications may be loaded onto the computing device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary 1/O subsystem 1240. A subscriber may also compose data items, such as e-mail messages, for example, which may be transmitted over the wireless network 1500 through the communication subsystem 1040.

For voice communications, the overall operation of the computing device 1000 may be similar. The speaker 1280 may output audible information converted from electrical signals, and the microphone 1300 may convert audible information into electrical signals for processing.

Figure 3:
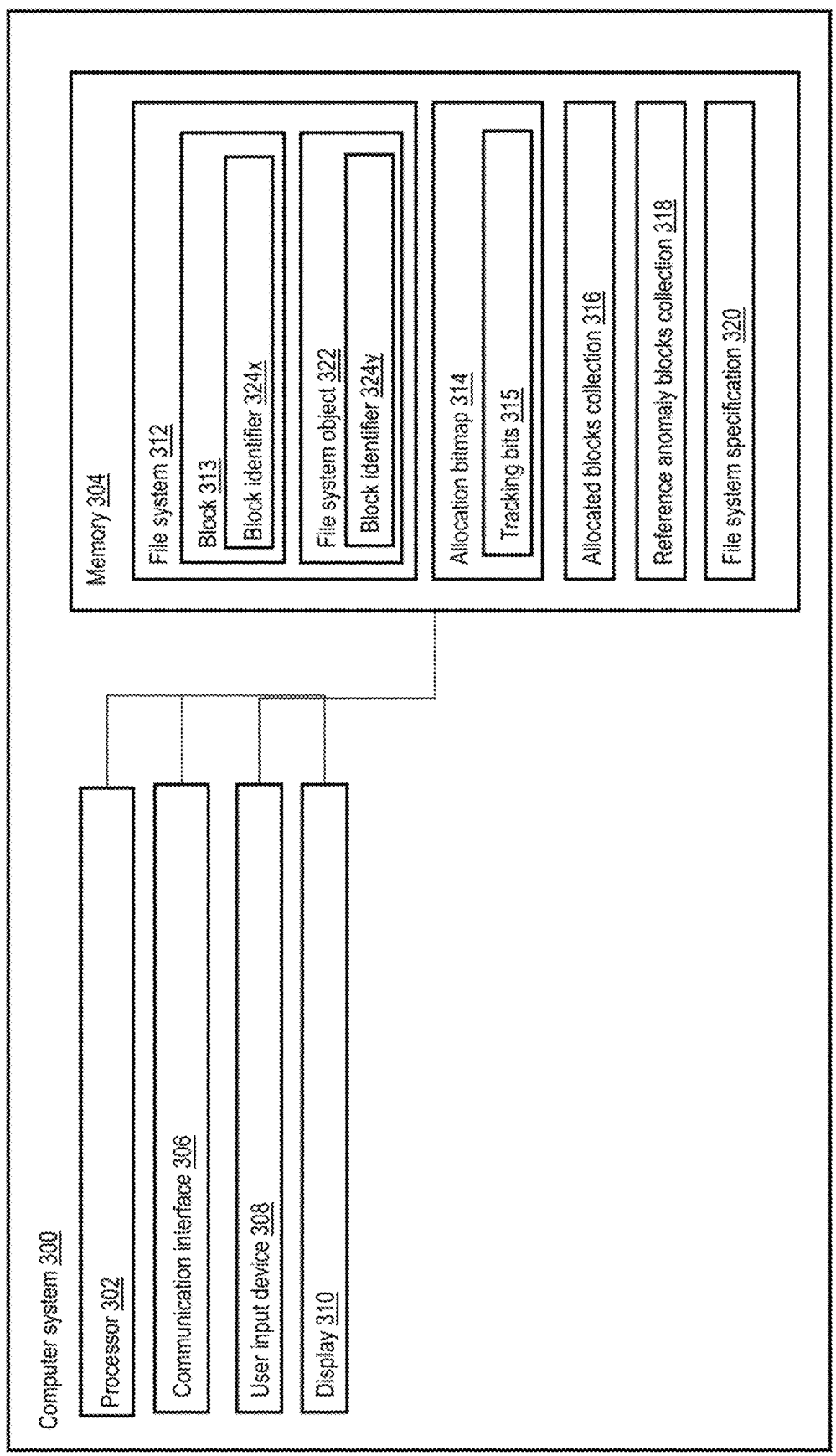
FIG. 3 is a block diagram of a computer system for evaluating integrity and parsing of a file system and parsing implementation, according to an embodiment.

Referring now to FIG. 3, shown therein is a computer system 300 for evaluating integrity and parsing of a file system, according to an embodiment. The computer system 300 may be the system 10 of FIG. 1. Aspects of the computer system 300 may be implemented at a single computing device or across a plurality of computing devices.

The system 300 includes a processor 302. The processor 302 is configured to evaluate the parsing of the file system.

The system 300 further includes a memory 304. The memory 304 is communicatively connected to the processor 302. The memory 304 stores computer-executable instructions which, when executed by the processor 302, cause the computer system 300 to perform the functions and provide the functionalities described herein, such as evaluating file parsing.

The system 300 further includes a communication interface 306. The communication interface 306 is configured to transmit and receive data to and from the computer system 300. In an embodiment, the communication interface 306 may include a network interface for communicating with one or more networked computing devices.

The system 300 further includes a user input device 308. The user input device 308 is configured to receive a user input from a user interacting with the system 300. The processor 302 may generate user input data in response to the user input received via the user input device 308 and store the user input data in the memory 304. The user input data may then be used by the processor 302 to control operation of the system 300.

The system 300 further includes a display device 310. The display device 310 is configured to display an output generated by the processor 302. In an embodiment, the display device 310 may display a graphical user interface configured to receive user input such that a user can interact with the system 300 and view outputs generated thereby.

The memory 304 includes a file system 312. The file system 312 has been parsed. The file system 312 includes blocks 313. The file system 312 stores file system objects 322. The file system objects 322 may include, for example, a file, directory, or other structure that occupies one or more blocks 313 in the file system 312. Each block 313 corresponds to a block identifier 324$x$. Each file system object 322 corresponds to a block identifier 324$y$. The block identifiers 324$x$, 324$y$ are collectively and generically referred to as the block identifier 324. The block identifier 324 is stored in the memory 304.

The memory 304 further includes a file system specification 320. In an embodiment, the memory 304 stores the file system specification 320.

The file system specification 320 provides protocols and means for referencing the blocks 313 for each file system object 322 in the file system 312. Each file system 312 may include a specific way of referencing the blocks 313 for each file system object 322. Accordingly, each file system 312 may be associated with a particular file system specification 320. In an embodiment, the processor 302 uses the file system specification to reference blocks 313 associated with each file system object 322.

The memory 304 further includes an allocation tracker 314 of the file system 312. The allocation tracker 314 is read by the processor 302. The allocation tracker 314 may be an allocation bitmap 314. The allocation bitmap 314 includes tracking bits 315. The tracking bits 315 track which blocks 313 in the file system 312 are currently allocated. Each tracking bit 315 may correspond to a single block 313 in the file system 312. In particular, each tracking bit 315 may correspond specifically to each block identifier 324. When a tracking bit 315 is set to true (e.g., '1'), the corresponding block 313 is allocated. When the tracking bit 315 is set to false (e.g., '0'), the corresponding block 313 is unallocated.

The memory 304 further includes an allocated blocks collection 316. The allocated blocks collection 316 stores each block identifier 324 whose corresponding tracking bit 315 is set to true (e.g., '1').

The memory 304 further includes a reference anomaly blocks collection 318. The reference anomaly blocks collection 318 stores each block identifier 324 that corresponds to a block 313 (or file system object 322) that is not allocated or was previously referenced by another file system object 322. The reference anomaly blocks collection 318 may be initially empty.

For each file system object 322, for each block 313 referenced by the file system object 322 according to the file system specification 320, the processor 302 determines whether the block identifier 324 corresponding to each block 313 (or file system object 322) is present in the allocated blocks collection 316. If so, the processor 302 removes the block identifier 324 from the allocation blocks collection 316. If not, the processor 302 adds the block identifier 324 to the reference anomaly blocks collection 318.

If both the allocated blocks collection 316 and the referenced allocated blocks collection 318 are empty at the conclusion of the processor 302 evaluating the parsing of the file system 312, the evaluation of the parsing of the file system 312 is considered successful.

A successful evaluation of the parsing of the file system 312 may further confirm that the file system 312 does not appear to be corrupted. In an embodiment, upon the successful evaluation, the processor 302 provides an indication that the file system 312 is considered uncorrupted.

If the evaluation of the parsing of the file system 312 is considered successful, a log entry may be made in the computer system 300.

If the evaluation of the parsing of the file system 312 is considered successful, a first visual indication (not shown) may be provided via the display 310 or the user input device 308, for example a green check mark.

If one or more of the allocated blocks collection 316 and the referenced allocated blocks collection 318 is not empty at the conclusion of the processor 302 evaluating the parsing of the file system 312, the evaluation of the parsing of the file system 312 is considered unsuccessful. For example, if the allocated blocks collection 316 includes a block identifier 324a at the conclusion of the evaluation, then either the file system 312 has indicated that a block 313a is allocated even though no file system object 322 references the block 313a identified by the block identifier 324a, or the file system 312 has incorrectly referenced the same block 313a in another file system object 322. In either case, memory space in the file system 312 may be wasted. As a further example, if the reference anomaly blocks collection 318 includes the block identifier 324a at the conclusion of the evaluation, then the file system 312 has indicated that the block 313a is unallocated even though a file system object 322 references the block 313a indicated by the block identifier 324a. In such a case, the data in the block 313a identified by the block identifier 324a may be overwritten or otherwise lost, which may lead to corruption of a file system object 322 or further loss of data.

If the evaluation of the parsing of the file system 312 is considered unsuccessful, a second visual indication (not shown) may be provided via the display 310 or the user input device 308, for example a red 'X'.

An unsuccessful evaluation of the parsing of the file system 312 may indicate that the file system 312 appears to be corrupted. In an embodiment, upon the unsuccessful evaluation, the processor 302 provides an indication that the file system 312 is considered corrupted and post-processing is performed, including any one or more of the following.

If the evaluation of the parsing of the file system 312 is considered unsuccessful, the processor 302 may troubleshoot the file system 312.

If the evaluation of the parsing of the file system 312 is considered unsuccessful, the processor 302 may be investigated for bugs by other components of the computer system 300 or otherwise troubleshot.

Following an unsuccessful evaluation of the parsing of the file system 312, direct parsing or raw carving on blocks 313 remaining in the allocated blocks collection 316 or the reference anomaly blocks collection 318 may be attempted.

Following an unsuccessful evaluation of the parsing of the file system 312, the processor 302 generates and displays a first notification indicating how much data appears to be corrupted (e.g., a count of apparently corrupted blocks 313 multiplied by size of the apparently corrupted blocks 313).

Following an unsuccessful evaluation of the parsing of the file system 312, the processor 302 generates and displays a second notification indicating which data in which blocks 313 remained in the allocated blocks collection 316 and/or the reference anomaly blocks collection 318 at the conclusion of the unsuccessful evaluation of the parsing of the file system 312.

Evaluation of the parsing of the file system 312 may be performed by the system 300 as the file system 312 is parsed or may be performed at a later time. Depending upon the results of the evaluation of the parsing of the file system 312 (e.g., whether the evaluation of the parsing of the file system 312 is considered successful or unsuccessful), further parsing, and/or further evaluation of the parsing and/or the further parsing may occur, according to the embodiments hereinabove described and/or otherwise.

The processor 302 may further parse the file system 312 concurrently with, previously to, or subsequently to evaluating integrity and parsing of the file system and parsing implementation.

Figure 4:
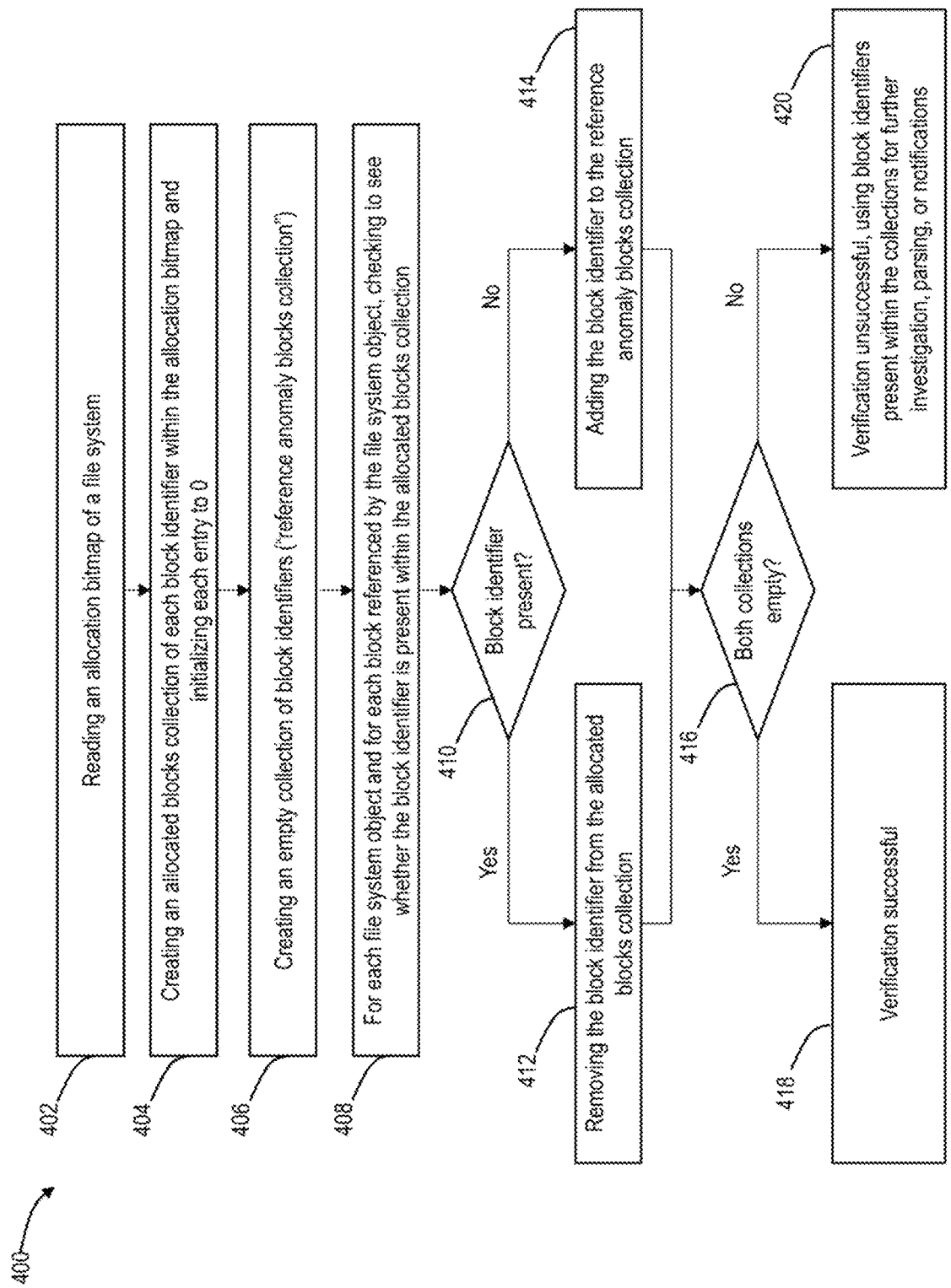
FIG. 4 is a flow chart of a method of evaluating integrity and parsing of a file system and parsing implementation, according to an embodiment.

Referring now to FIG. 4, shown therein is a method 400 of evaluating integrity and parsing of a file system, according to an embodiment. The method 400 may be executed by the computer system 10 of FIG. 1 or the computer system 300 of FIG. 3.

The method 400 may be performed as the file system is parsed or later, after initial file system parsing.

At 402, the method 400 includes reading an allocation tracker 314 corresponding to a file system 312.

At 404, the method 400 further includes creating a collection of each block identifier 324 within the allocation tracker 314 that is indicated to be currently allocated. The collection is referred to as the "allocated blocks collection" 316.

At 406, the method 400 further includes creating an empty collection of block identifiers 324. This collection is referred to as the "reference anomaly blocks collection" 318.

Each file system 312 has a specific way of referencing blocks 313 for a file system object 322. For each file system object 322, reference may be had to a file system specification 320 to ensure all references are properly collected. The method 400 may further include using the file system specification 320 to reference the blocks 313 associated with each file system object 322.

At 408, the method 400 further includes, for each file system object 322 and for each block 313 referenced by the file system object 322, checking to see whether the allocated blocks collection 316 includes the block identifier 324. Such checking may be performed according to a depth-first search of the parsing of the file system (e.g., of a tree representing the parsing of the file system 312), according to a breadth-first search of the parsing of the file system, or according to any other conventional iterative or recursive means for checking each block of the file system 312.

At 410, the method 400 branches based on the determination at 410.

If the allocated blocks collection 316 includes the block identifier 324 at 410, the method 400 proceeds to 412.

At 412, the method 400 further includes removing the block identifier 324 from the allocated blocks collection 316.

If the allocated blocks collection 318 does not include the block identifier 324, the method 400 proceeds to 414.

At 414, the method 400 further includes adding the block identifier 324 to the reference anomaly blocks collection 318.

At 416, the method 400 branches upon completion.

If, at 416, both the allocated blocks collection 316 and the reference anomaly blocks collection 318 are empty, the evaluation is considered successful at 418.

If, at 416, either or both of the allocated blocks collection 316 and the reference anomaly blocks collection 318 is not empty, the evaluation is considered unsuccessful at 420. The method 400 may further include using the block identifiers 324 included in either or both of the allocated blocks collection 316 and the reference anomaly blocks collection 318 for further investigation, parsing, and/or notifications.

The creation of the allocated blocks collection 316 and the reference anomaly blocks collection 318 may be implemented in any of a variety of programming languages. The allocated blocks collection 316 and the reference anomaly blocks collection 318 may vary in the specific collection type used according to technical features and limitations of the software and hardware implementing the present disclosure. For example, for high performance, a collection type may be chosen that is thread-safe (i.e., that is able to support multiple processor threads simultaneously interacting with each of the allocated blocks collection 316 and/or the reference anomaly blocks collection 318).

A user implementing and/or applying the foregoing method 400 may advantageously select to what file system 312 to apply the method 400. This selection may be made, for example, by providing input data via a graphical user interface (not shown).

Figure 5A:
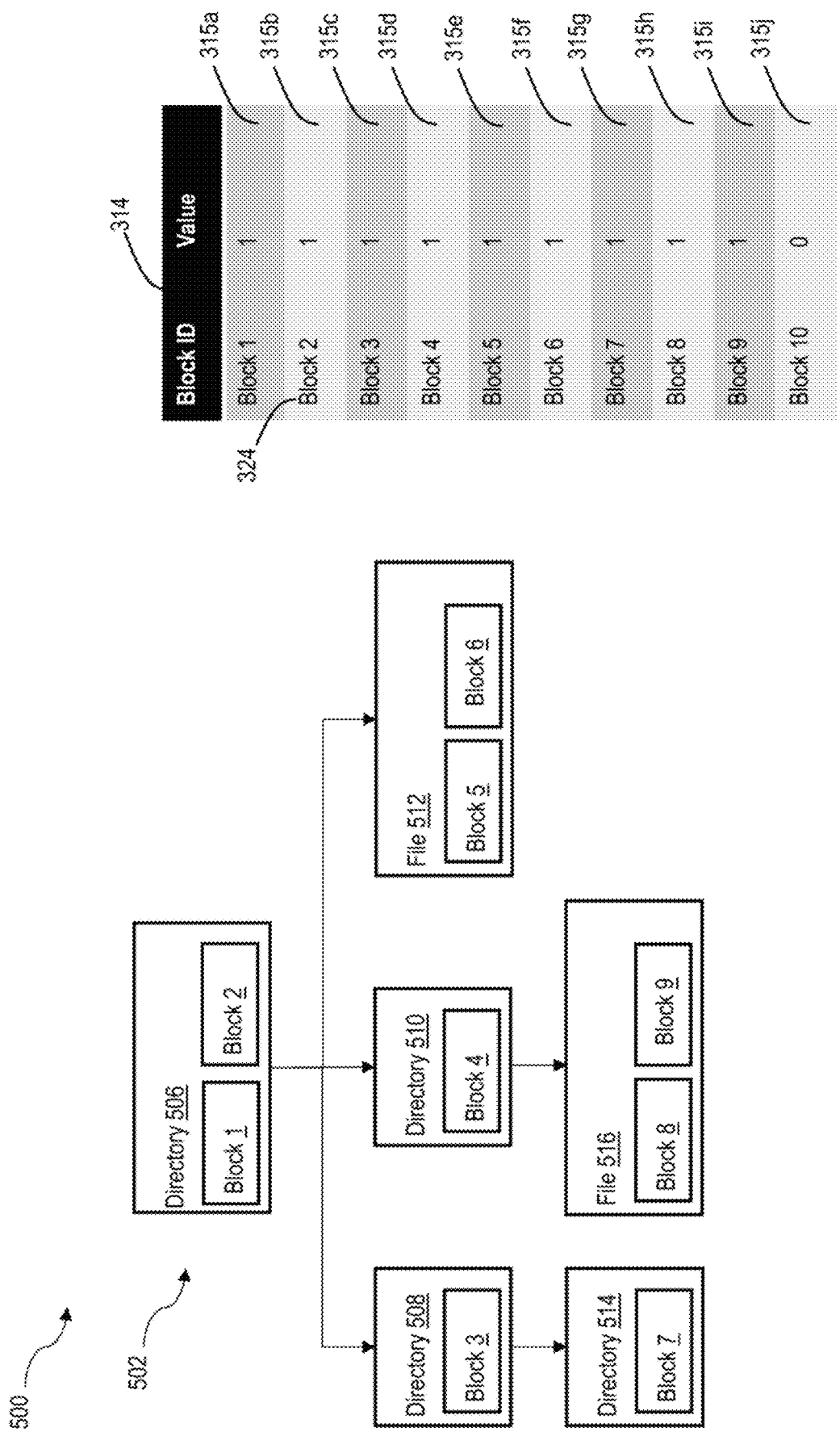
FIG. 5A is a block diagram of a correct parsing of a file system according to the method of FIG. 4, according to an embodiment.

Referring now to FIG. 5A, shown therein is a correct parsing 500 of a file system 312 to be evaluated, according to an embodiment.

The parsing 500 includes a structure 502. The structure 502 represents a structure of the file system 312 as determined during the parsing. The structure 502 includes a parent directory 506. The parent directory 506 includes intermediate directories 508, 510 and a file 512. The file may be a file system object 322. The intermediate directory 508 further includes a child directory 514, which is empty (i.e., the child directory 514 includes no files and no further directories). The intermediate directory 510 includes a file 516.

The file system 312 includes blocks 313 (identified with specific labels for ease of reading, e.g., 'Block 1'). Each of the directories and files is stored at or as one or more blocks 313 as shown in FIG. 5A. For example, the directory 506 is stored at or as block 1 and block 2. In an embodiment, each directory and each file is understood as including the corresponding blocks as indicated in FIG. 5A, i.e., the corresponding blocks are a part of each directory and each file. In an embodiment, each directory and each file is not understood as including the corresponding blocks as indicated in FIG. 5A, i.e., the corresponding blocks are not a part of the structure 502 and are included in FIG. 5A only for convenience of the reader.

Each of the labels "Block 1", "Block 2", etc. may be understood to be a block identifier 324 corresponding to each block 313.

The parsing 500 further includes an allocation tracker 314 corresponding to the structure 502. The allocation tracker 314 is an allocation bitmap. The allocation tracker 314 includes tracking bits 315a, 315b, 315c, 315d, 315e, 315f, 315g, 315h, 315i, and 315j (collectively referred to as the tracking bits 315 and generically referred to as the tracking bit 315) corresponding to the block identifiers 324.

The tracking bits 315 each have a value of '1' or '0', i.e., true or false. When a tracking bit 315 is set to true, the file system 312 is understood to consider the block 313 whose block identifier 324 corresponds to the tracking bit 315 as allocated. According to a file system specification 320 of the file system 312, the block 313 should not be overwritten, as the block 313 is being used to store data, for example block 8 and block 9 of the file 516.

Notably the underlying file system 312 includes 10 blocks, of which only 9 are currently allocated (as the tracking bit 315j is set to false).

The parsing 500 in FIG. 5A has been performed correctly because every block 324 that is indeed allocated has a corresponding tracking bit 315 set to true and because every tracking bit 315 set to true corresponds to a block 324 that has indeed been allocated.

Applying the method 400 to the parsing 500 would result in an allocated blocks collection 316 initially including each of block 1 through block 9 (according to the allocation tracker 314) and a reference anomaly blocks collection 318 initially empty.

Applying the method 400 to the parsing 500 would further result in, for each file system object 322 (such as the directories 506, 508, 510, 514 and the files 512, 516) and for each block 313 referenced by the file system object 322, determining whether the block identifier 324 corresponding to the block 313 is present within the allocated blocks collection 316.

Because each block identifier 324 corresponding to blocks 1 through 9 is indeed present in the allocated blocks collection 316, each of blocks 1 through 9 is removed from the allocated blocks collection 316, leaving the allocated blocks collection 316 empty. Because no tracking bit 315 indicates a block identifier 324 is allocated where the corresponding block 313 is not allocated (i.e., because block 10 is correctly indicated as not allocated according to the tracking bit 315j), the reference anomaly blocks collection 318 has remained empty.

Because, at the end of applying the method 400 to the parsing 500, both the allocated blocks collection 316 and the reference anomaly blocks collection 318 are empty, the parsing 500 is considered successful.

Figure 5B:
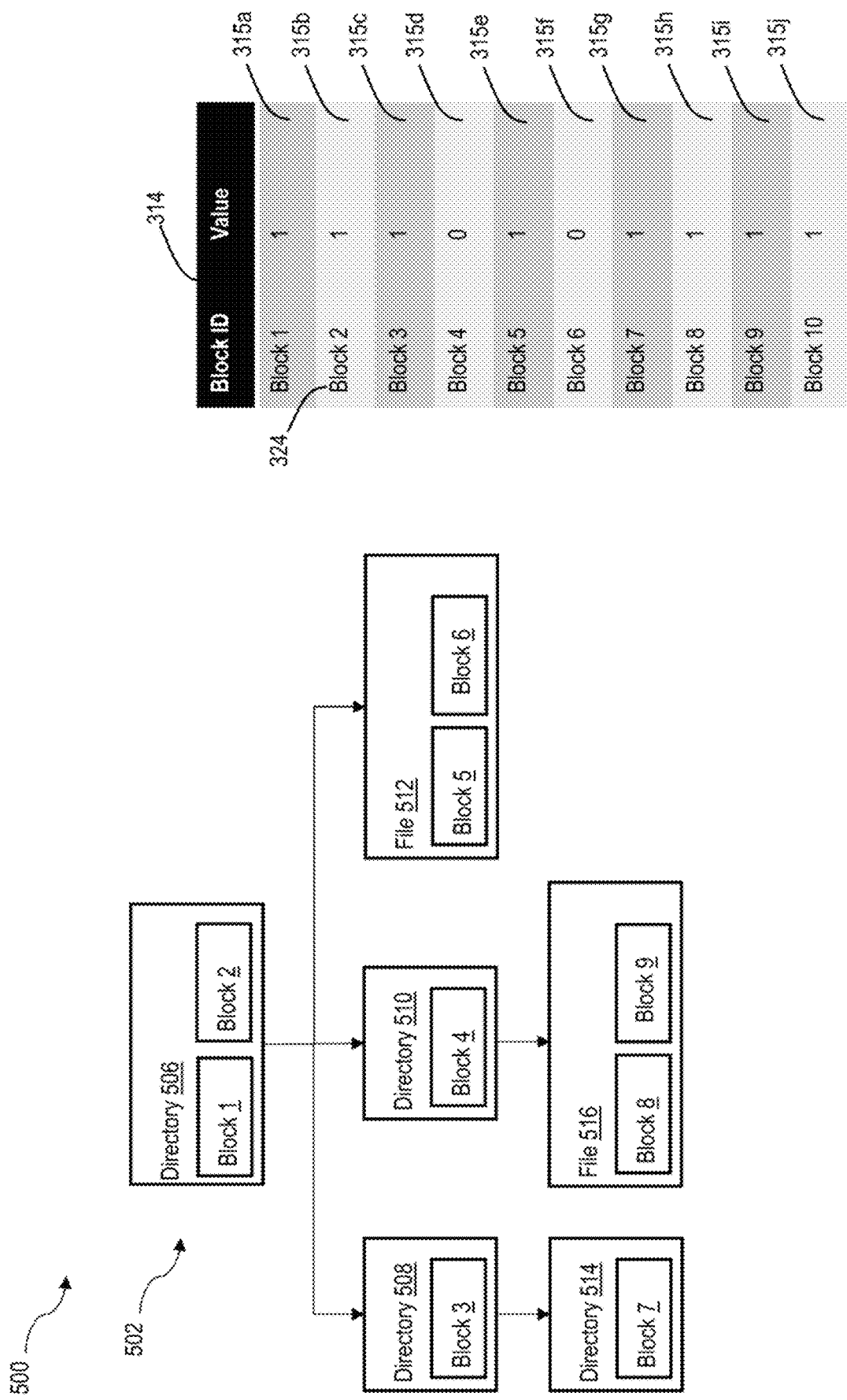
FIG. 5B is a block diagram of an incorrect parsing of a file system according to the method of FIG. 4, according to an embodiment.

Referring now to FIG. 5B, shown therein is an incorrect parsing 501 of a file system 312 to be evaluated, according to an embodiment. Identical numerals denote identical references with respect to FIG. 5A.

In FIG. 5B, the allocation tracker 314 includes several incorrect tracking bits 315. Specifically, the tracking bit 315d is set to 0 even though block 4 is allocated to the directory 510, the tracking bit 315f is set to 0 even though block 6 is allocated to the file 512, and the tracking bit 315j is set to 1 even though block 10 is not allocated anywhere within the structure 502.

Applying the method 400 to the parsing 501 would result in an allocated blocks collection 316 initially including each of blocks 1 through 3, block 5, and blocks 7 through 10

(according to the allocation tracker 314) and a reference anomaly blocks collection 318 initially empty.

Applying the method 400 to the parsing 500 would further result in, for each file system object 322 (such as the directories 506, 508, 510, 514 and the files 512, 516) and for each block 313 referenced by the file system object 322, determining whether the block identifier 324 corresponding to the block 313 is present within the allocated blocks collection 316.

Because the block identifiers 324 corresponding to blocks 4 and 6 are not present in the allocated blocks collection 316, each of blocks 4 and 6 is added to the reference anomaly blocks collection 318. Because the tracking bit 315j indicates that block 10 is allocated even though block 10 is not allocated (and so block 10 is not encountered as a block 313 referenced by the file system object 322), the block identifier 324 corresponding to block 10 is not removed from the allocated blocks collection 316.

Because, at the end of applying the method 400 to the parsing 501, both the allocated blocks collection 316 and the reference anomaly blocks collection 318 are not empty, the parsing 501 is considered unsuccessful. The parsing would be considered unsuccessful even if only one of the allocated blocks collection 316 or the reference anomaly blocks collection 318 were not empty, i.e., even if only one of the tracking bits 315d, 315f, and 315j were incorrect.

Because block identifiers 324 corresponding to blocks 4 and 6 are present in the reference anomaly blocks collection 318 and because block 10 is present in the allocated blocks collection 316, further investigation, parsing, and/or notification may take place, with the identities of blocks 4, 6, and 10 as a starting point.

Figure 6A:
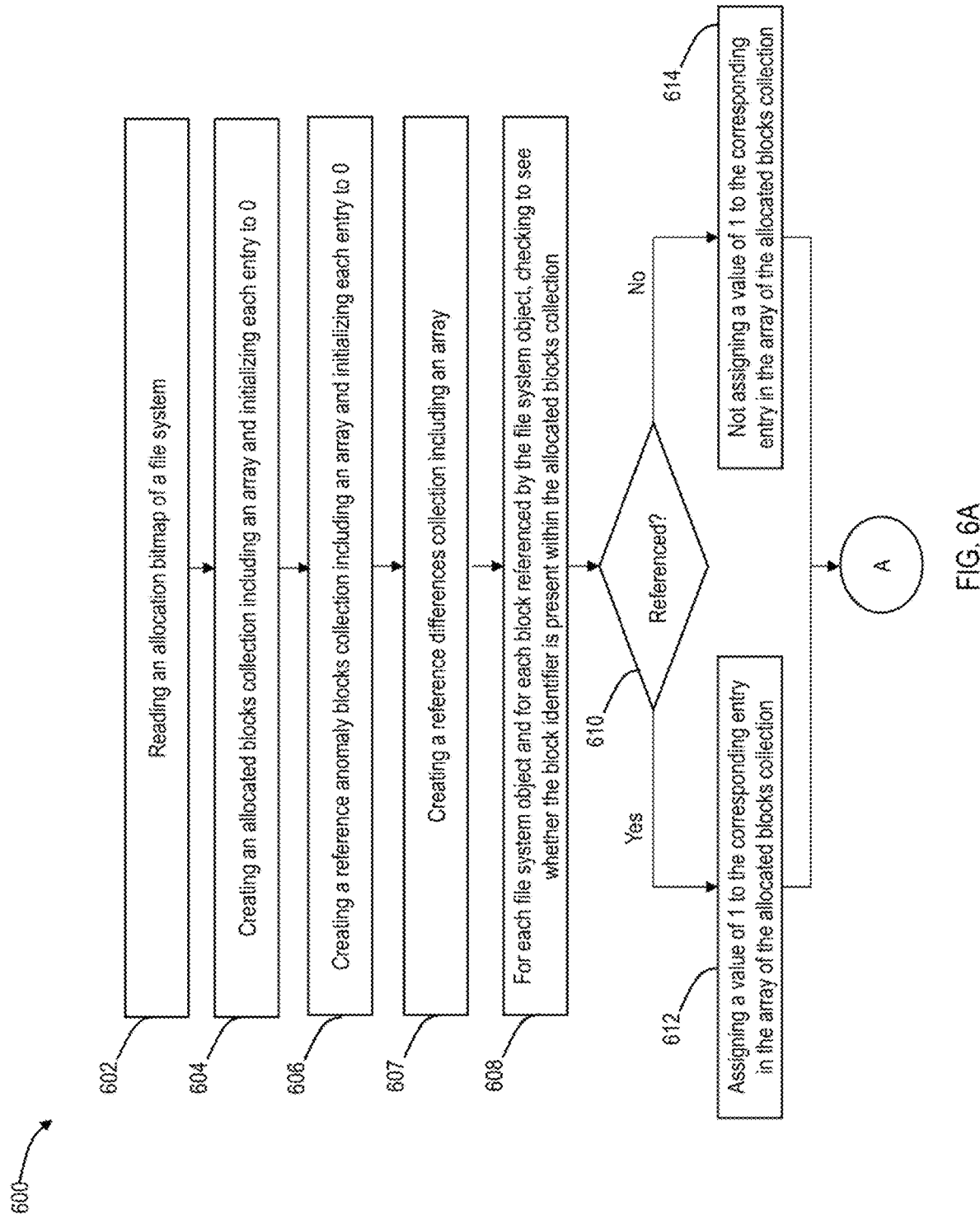
FIGS. 6A and 6B are a flow chart of a method of evaluating integrity and parsing of a file system and parsing implementation, according to an embodiment.
Figure 6B:
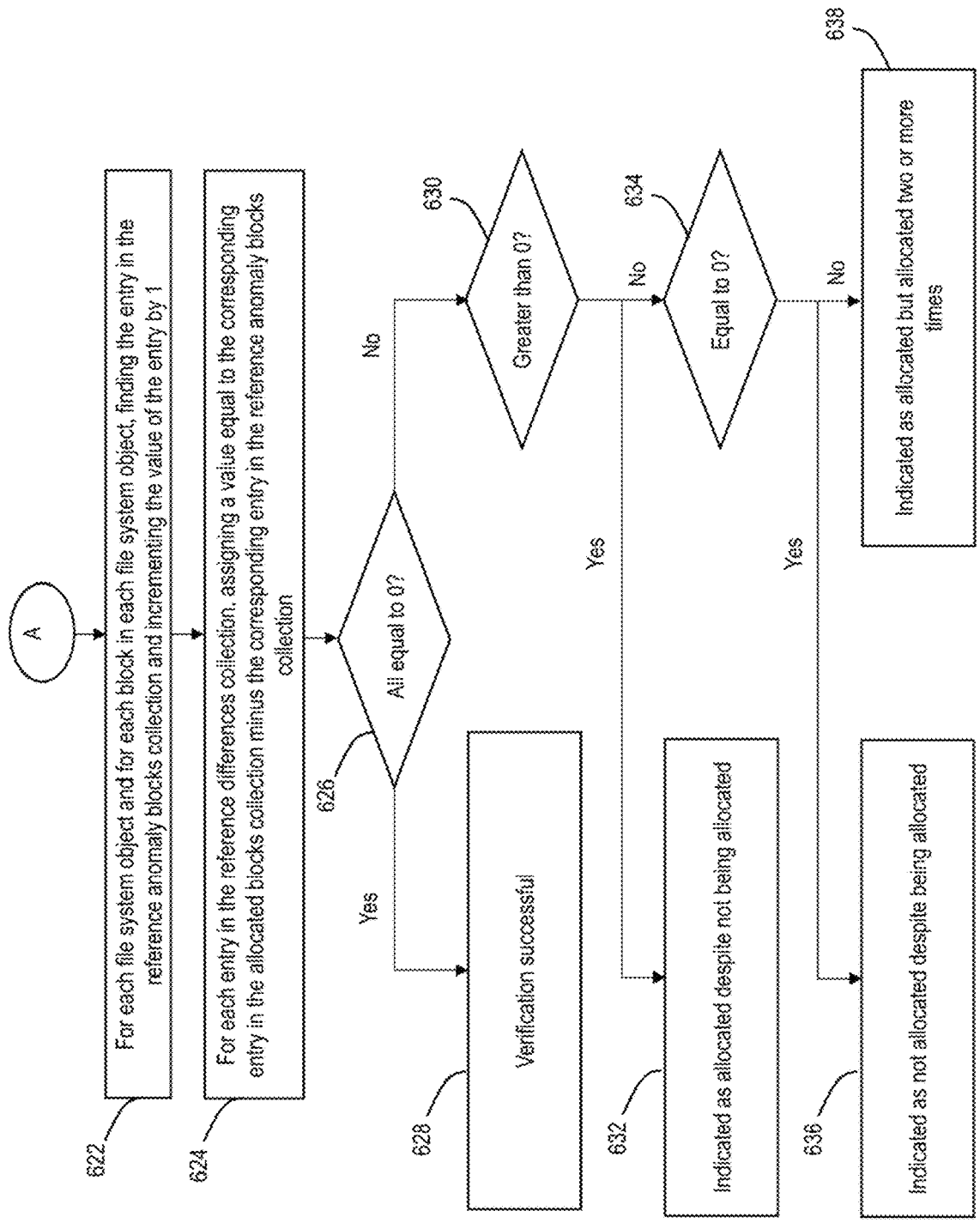

Referring now to FIGS. 6A and 6B, shown therein is a method 600 of evaluating integrity and parsing of a file system, according to an embodiment. The method 600 may be executed by the computer system 10 of FIG. 1 or the computer system 300 of FIG. 3.

The method 600 may be performed as the file system 312 is parsed or later, after initial parsing of the file system 312. In an embodiment, the method 600 includes parsing the file system 312.

At 602, the method 600 includes reading an allocation bitmap 314 of a file system 312.

At 604, the method 600 includes creating an allocated blocks collection 316 including an array (not shown) including an entry (not shown) for each block 313 and each file system object 322. Each entry is initialized to 0.

At 606, the method 600 includes creating a reference anomaly blocks collection 318 including an array (not shown) including an entry (not shown) for each block 313 and each file system object 322. Each entry is initialized to 0.

At 607, the method 600 includes creating a reference differences collection (not shown) including an array (not shown) including an entry (not shown) for each block 313 and each file system object 322.

At 608, the method 600 further includes, for each file system object 322 and for each block 313 referenced by the file system object 322, checking to see whether the file system object 322 or the block 313 is referenced by the file system 312. Such checking may be performed according to a depth-first search of the parsing of the file system (e.g., of a tree representing the parsing of the file system 312), according to a breadth-first search of the parsing of the file system, or according to any other conventional iterative or recursive means for checking each block of the file system 312.

At 610, the method 600 branches based on the determination at 610.

If the file system 312 references the file system object 322 or the block 313 at 610, the method 600 proceeds to 612.

At 612, the method 600 includes assigning a value of 1 to the corresponding entry in the array of the allocated blocks collection 316.

If the file system 312 does not reference the file system object 322 or the block 313, the method 600 proceeds to 614.

At 614, the method 600 further includes not assigning a value of 1 to the corresponding entry in the array of the allocated blocks collection 316.

At 622, the method 600 includes, for each file system object 322 and for each block 313 in or referenced by each file system object 322, finding the corresponding entry in the reference anomaly blocks collection 318 and incrementing the value of the corresponding entry by 1. The value of an entry corresponding to each block 313 in the reference anomaly blocks collection 318 thus represents the number of times each file system object 322 and block 313 has been allocated.

At 624, the method 600 includes, for each entry in the array of the reference differences collection, assigning to that entry a value equal to the value of the corresponding entry for the same block in the allocated blocks collection 316 minus the value of the corresponding entry for the same block in the reference anomaly blocks collection 318.

At 626, the method 600 branches based on the values of the reference differences collection.

If all values of the reference differences collection are equal to 0, the method 600 proceeds to 628, and the file system 312 is indicated as being correctly parsed.

If all values of the reference differences collection are not equal to 0, the method 600 proceeds to 630.

At 630, the method 600 branches based on the determination at 630.

For each file system object 322 and for each block 313 in each file system object 322, if a value of an entry in the reference differences collection is greater than 0, the method 600 proceeds to 632.

At 632, the method 600 includes indicating the file system object 322 or the block 313 is indicated by the file system 312 as allocated despite not being allocated.

For each file system object 322 and for each block 313 in each file system object 322, if a value of an entry in the reference differences collection is not greater than 0, the method 600 proceeds to 634.

At 634, the method 600 branches based on the determination at 634.

If a value of an entry in the reference differences collection is less than 0 and a value of the corresponding entry in the allocated blocks collection 316 is equal to 0, the method 600 proceeds to 636.

At 636, the corresponding block 313 is indicated by the file system 312 as not allocated but is associated with one or more file system objects 322. The corresponding block 313 may be considered "under-allocated".

If a value of an entry in the reference differences collection is less than 0 and a value of the corresponding entry in the allocated blocks collection is 1, the method proceeds to 638.

At 638, the block 313 is indicated as allocated by the file system 312 but is allocated two or more times. The block 313 may be considered "overallocated".

In an embodiment, one or more of the arrays of the allocated blocks collection 316, the reference anomaly blocks collection 318, and/or the reference differences collection is a matrix.

In an embodiment, one or more of the arrays of the allocated blocks collection 316, the reference anomaly blocks collection 318, and/or the reference differences collection is a collection other than an array or a matrix.

At 632, 636, and 638, each of which represent an unsuccessful verification, the method 600 may further include using block identifiers 324 associated with non-zero values in the references differences collection for further investigation, parsing, and/or notifications.

The creation of the allocated blocks collection 316, the reference anomaly blocks collection 318, and the reference differences collection (not shown) may be implemented in any of a variety of programming languages. The allocated blocks collection 316, the reference anomaly blocks collection 318, and the reference differences collection may vary in the specific collection type used according to technical features and limitations of the software and hardware implementing the present disclosure. For example, for high performance, a collection type may be chosen that is thread-safe (i.e., that is able to support multiple processor threads simultaneously interacting with each of the allocated blocks collection 316, the reference anomaly blocks collection 318, and/or the reference differences collection).

A user implementing and/or applying the foregoing method 400 may advantageously select to what file system 312 to apply the method 400. This selection may be made, for example, by providing input data via a graphical user interface (not shown).

Figure 7A:
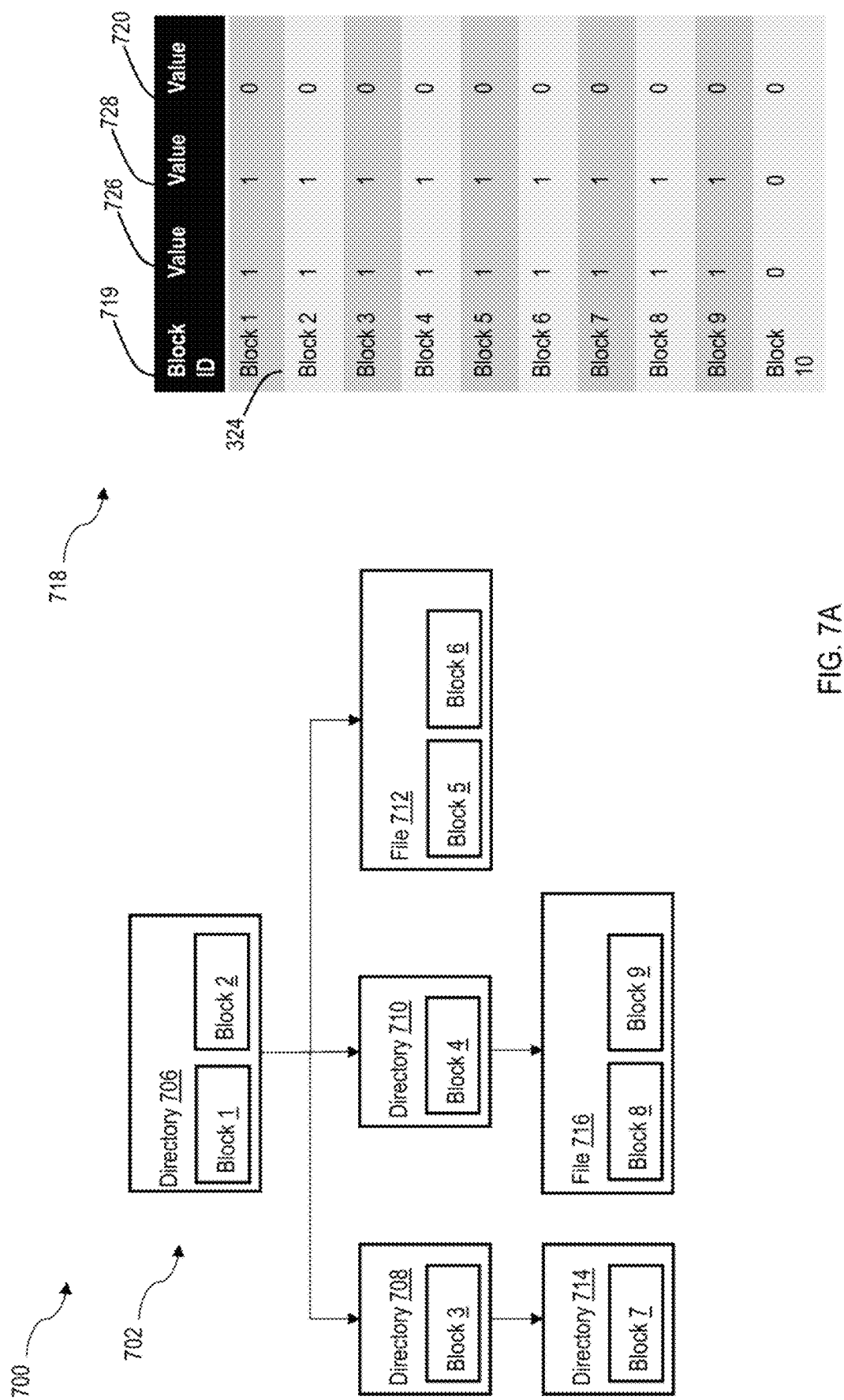
FIG. 7A is a block diagram of a correct parsing of a file system according to the method of FIGS. 6A and 6B, according to an embodiment.

Referring now to FIG. 7A, shown therein is a correct parsing 700 of a file system 312 to be evaluated, according to an embodiment.

The parsing 700 includes a structure 702. The structure 702 represents a structure of the file system 312 as determined during the parsing. The structure 702 includes a parent directory 706. The parent directory 706 includes intermediate directories 708, 710 and a file 712. The file may be a file system object 322. The intermediate directory 708 further includes a child directory 714, which is empty (i.e., the child directory 714 includes no files and no further directories). The intermediate directory 710 includes a file 716.

The file system 312 includes blocks 313. Each of the directories and files is stored at or as one or more blocks 313 as shown in FIG. 7A. For example, the directory 706 is stored at or as block 1 and block 2. In an embodiment, each directory and each file is understood as including the corresponding blocks as indicated in FIG. 7A, i.e., the corresponding blocks are a part of each directory and each file. In an embodiment, each directory and each file are not understood as including the corresponding blocks as indicated in FIG. 5A, i.e., the corresponding blocks are not a part of the structure 702 and are included in FIG. 7A only for convenience of the reader.

Each of the labels "Block 1", "Block 2", etc. may be understood to be a block identifier 324 corresponding to each block 313.

The parsing 700 further includes a values chart 718 corresponding to the structure 502. The values chart 718 includes a reference column 719 for listing block identifiers 324, for example the label "Block 1" corresponding to the block so labelled in the directory 706. The values chart 718 further includes first, second, and third columns 726, 728, and 720 corresponding to each of the allocated blocks collection 316, the reference anomaly blocks collection 318, and the reference differences collection (not shown). Specifically, the value in each of the columns 726, 728, and 720 corresponding to a block 313 are set according to the operation of the method 600 as shown in FIG. 6.

In an embodiment, the values chart 718 is stored in the computer system 300 during operation of the method 600. In an embodiment, the values chart 718 is not stored in the computer system 300 during operation of the method 600.

Notably the underlying file system 312 includes 10 blocks, of which only 9 are currently allocated (as the value corresponding to block 10 in the first column 726 corresponding to the allocated blocks collection 316 is set to '0').

The parsing 700 in FIG. 7A has been performed correctly because every value in the third column 720 corresponding to the reference differences collection is '0'. Every value in the third column 720 is '0' because every value in the first column 726 is equal to the corresponding value in the second column 728. The values in the first and second columns 726, 728 are equal because every block 324 that is indeed allocated has a corresponding value of '1' in the first column 726 and because every value of '1' in the second column 728 corresponds to a block 324 that has indeed been allocated.

Because, at the end of applying the method 600 to the parsing 700, all values in the third column corresponding to the reference differences collection are equal to 0, the parsing 700 is considered successful.

Figure 7B:
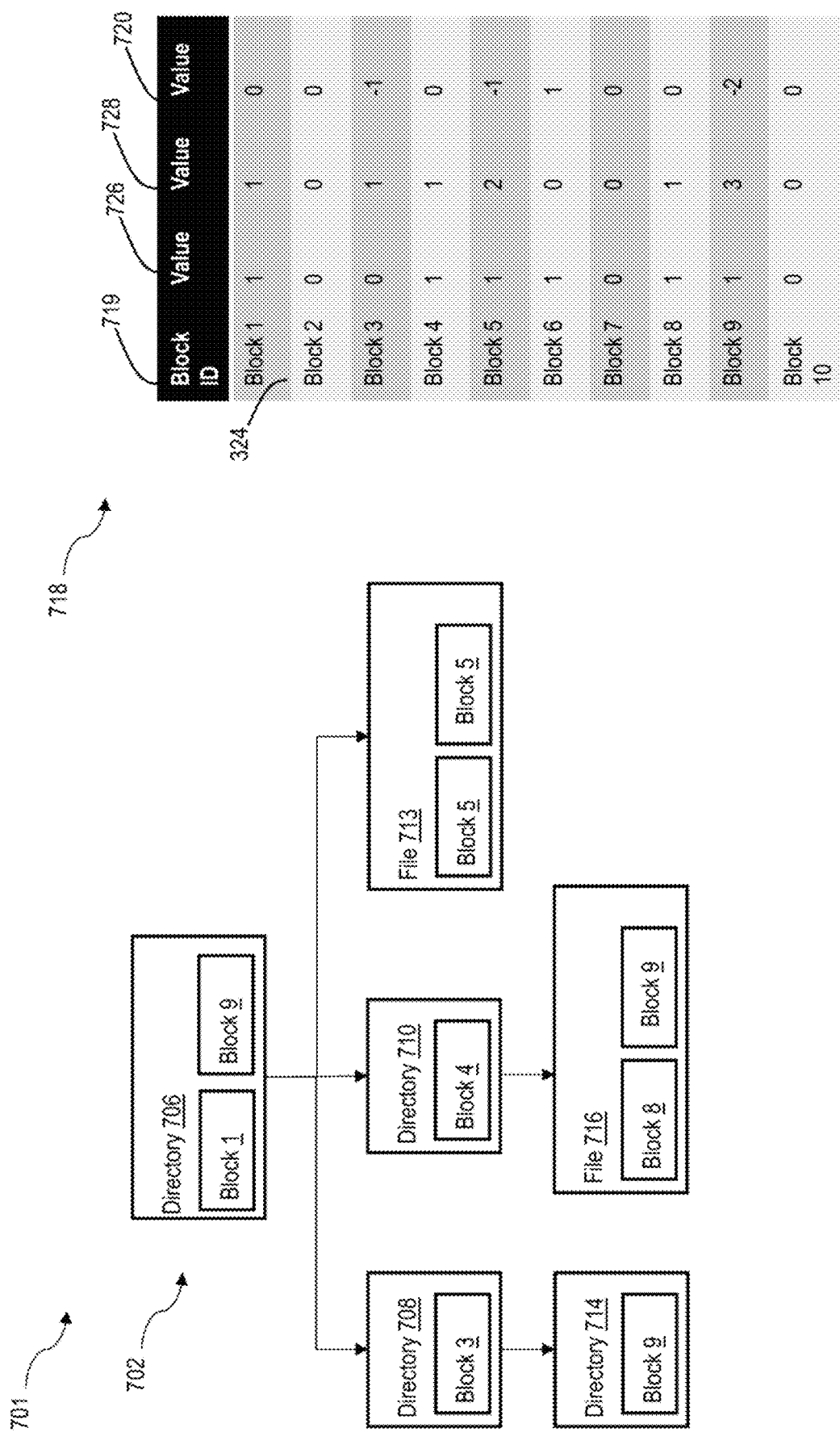
FIG. 7B is a block diagram of an incorrect parsing of a file system according to the method of FIGS. 6A and 6B, according to an embodiment.

Referring now to FIG. 7B, shown therein is an incorrect parsing 701 of a file system 312 to be evaluated, according to an embodiment. Identical numerals denote identical references with respect to FIG. 7A.

In FIG. 7B, the third column 720 has several non-zero values, which indicate that the parsing 701 is incorrect.

In the row associated with Block 6, the value in the first column 726 is '1', indicating the file system 312 considers Block 6 to be allocated. However, Block 6 is not allocated in the structure 702 because the file 713 includes Block 5 twice over. Accordingly, the value corresponding to Block 6 in the second column 728 is '0'. Therefore the value corresponding to Block 6 in the third column 720 is 1. According to 632 of the method 600, the result is returned that Block 6 is incorrectly indicated as being allocated by the file system 312 despite not actually being allocated.

Moreover, because Block 5 is referenced twice in association with the file 713, the value associated with Block 5 in the second column 728 is '2'. Accordingly, when this value of the second column 728 is subtracted from the corresponding value '1' associated with the first column 726, the value of the third column 720 is '−1'. According to 638 of the method 600, the result is returned that Block 5 is indicated as allocated by the file system 312 but is actually allocated two or more times. Similar comments apply with respect to Block 9, which is allocated 3 times for a value of −2 in the third column 720.

Because Block 3 is incorrectly indicated as not being allocated (according to the file system 312) and has a corresponding value of '0' in the first column 726 but is actually allocated and has a corresponding value of '1' in the first column 728, the value of the third column is also '−1' as with Block 5. However, because the corresponding value in the first column 726 is '0', the method at 634 instead branches to 636. At 636, the result is returned that Block 3 is incorrectly indicated as not being allocated by the file system 312 despite actually being allocated.

Because, at the end of applying the method 600 to the parsing 701, each of the values associated with Block 3, Block 5, Block 6, and Block 9 is not equal to '0', the parsing 701 is considered unsuccessful. The parsing would be considered unsuccessful even if only one such value were not equal to '0', i.e., if even one such block were improperly not allocated, under-allocated, or over-allocated.

Because the blocks 313 corresponding to the non-zero values in the third column 720 are identified by the block identifiers 324, further investigation, parsing, and/or notification may take place, with the identities of Block 3, Block 5, Block 6, and Block 9 as one or more starting points.

While the above description provides examples of one or more apparatus, methods, or systems, it will be appreciated that other apparatus, methods, or systems may be within the scope of the claims as interpreted by one of skill in the art.

The invention claimed is:

1. A system for evaluating integrity and parsing of a file system and parsing implementation, the file system comprising file system objects, each file system object comprising at least one block, each block uniquely associated with a block identifier, the system comprising:
    a processor for evaluating the integrity and the parsing of the file system;
    a memory communicatively connected to the processor and storing computer- executable instructions that, when executed by the processor, cause the system to:
    read an allocation tracker indicating allocation of each block identifier;
    create an allocated blocks collection of each block identifier within the allocation tracker that is indicated to be currently allocated, the allocated blocks collection including an allocated blocks array;
    create a reference anomaly blocks collection, the reference anomaly blocks collection including a reference anomaly blocks array;
    initialize each entry of the allocated blocks array to 0;
    initialize each entry of the reference anomaly blocks array to 0;
    create a reference differences collection, the reference differences collection including a reference differences array;
    for each file system object, for each block referenced by the file system object, determine that the associated block identifier is present in the allocated blocks collection or determine that the associated block identifier is not present in the allocated blocks collection;
    where the file system uses the associated block identifier to reference the block, assign a value of 1 to the corresponding entry in the allocated blocks collection;
    where the file system does not use the associated block identifier to reference the block, do not assign a value of 1 to the corresponding entry in the allocated blocks collection;
    for each file system object, for each block referenced by the file system object, increment the value of the corresponding entry in the reference anomaly blocks array by 1;
    for each entry in the reference differences array, assign a value equal to the value of the corresponding entry in the allocated blocks array minus the corresponding entry in the reference anomaly blocks array;
    determine that each entry in the reference differences array is equal to 0, or determine that at least one entry in the reference differences array is less than 0;
    where each entry in the reference differences array is equal to 0, indicate a successful evaluation; and
    where at least one entry in the reference differences array is less than 0, determine that the corresponding entry in the allocated blocks array is equal to 0 or determine that the corresponding entry is equal to 1;
    where the corresponding entry is equal to 0, indicate an unsuccessful evaluation because the block associated with the corresponding entry is under-allocated;
    where the corresponding entry is equal to 1, indicate an unsuccessful evaluation because the block associated with the corresponding entry is over-allocated.

2. The system of claim 1, wherein the allocation tracker comprises an allocation bitmap, the allocation bitmap comprising at least one bit, each bit corresponding to a block within the file system in a bijection, wherein when a bit is set to true, the corresponding block is considered allocated, and wherein when a bit is set to false, the corresponding block is considered unallocated.

3. The system of claim 1, wherein the allocation tracker comprises a file allocation table.

4. The system of claim 1, wherein each file system object is a file, a directory, or another structure that occupies blocks in the file system.

5. The system of claim 1, wherein the processor uses a file system specification stored in the memory to reference blocks associated with each file system object.

6. The system of claim 1, wherein upon the successful evaluation, the processor provides an indication that the file system is considered uncorrupted.

7. The system of claim 1, wherein upon the unsuccessful evaluation, the processor provides an indication that the file system is considered corrupted and performs post-processing based on the unsuccessful evaluation.

8. The system of claim 1, wherein upon the unsuccessful evaluation, the processor performs post-processing comprising troubleshooting the file system or the processor.

9. The system of claim 1, wherein upon the unsuccessful evaluation, the processor performs post-processing comprising direct parsing or raw carving on blocks remaining in the allocated blocks collection or the reference anomaly blocks collection.

10. The system of claim 1, wherein upon the unsuccessful evaluation, the processor performs post-processing comprising generating and displaying a notification indicating how much data in the file system appears to be corrupted.

11. The system of claim 10, wherein the processor generates and displays the notification indicating how much data in the file system appears to be corrupted by multiplying a count of apparently corrupted blocks by a size of the apparently corrupted blocks.

12. A method for evaluating integrity and parsing of a file system and parsing implementation implemented in a processor, the file system comprising file system objects, each file system object comprising at least one block, each block uniquely associated with a block identifier, the method comprising:
    reading an allocation tracker indicating allocation of each block identifier;
    creating an allocated blocks collection of each block identifier within the allocation tracker that is indicated to be currently allocated, the allocated blocks collection including an allocated blocks array;
    creating a reference anomaly blocks collection, the reference anomaly blocks collection including a reference anomaly blocks array;
    initializing each entry of the allocated blocks array to 0;
    initializing each entry of the reference anomaly blocks array to 0;

creating a reference differences collection, the reference differences collection including a reference differences array;

for each file system object, for each block referenced by the file system object, determining that the associated block identifier is present in the allocated blocks collection or determining that the associated block identifier is not present in the allocated blocks collection;

where the file system uses the associated block identifier to reference the block, assigning a value of 1 to the corresponding entry in the allocated blocks collection;

where the file system does not use the associated block identifier to reference the block, not assigning a value of 1 to the corresponding entry in the allocated blocks collection;

for each file system object, for each block referenced by the file system object, incrementing the value of the corresponding entry in the reference anomaly blocks array by 1;

for each entry in the reference differences array, assigning a value equal to the value of the corresponding entry in the allocated blocks array minus the corresponding entry in the reference anomaly blocks array;

determining that each entry in the reference differences array is equal to 0, or determining that at least one entry in the reference differences array is less than 0;

where each entry in the reference differences array is equal to 0, indicating a successful evaluation; and where at least one entry in the reference differences array is less than 0, determining that the corresponding entry in the allocated blocks array is equal to 0 or determining that the corresponding entry is equal to 1;

where the corresponding entry is equal to 0, indicating an unsuccessful evaluation because the block associated with the corresponding entry is under-allocated;

where the corresponding entry is equal to 1, indicating an unsuccessful evaluation because the block associated with the corresponding entry is over-allocated.

13. The method of claim 12, wherein upon the unsuccessful evaluation, the method further comprises performing post-processing comprising generating and displaying a notification indicating which blocks are under-allocated or which blocks are over-allocated.

14. The method of claim 12, wherein the method for evaluating the integrity and the parsing of the file system and parsing implementation is performed concurrently with parsing the file system.

15. The method of claim 12, wherein the method for evaluating the integrity and the parsing of the file system and parsing implementation is performed subsequently to parsing the file system.

16. The method of claim 12, wherein determining that the associated block identifier is present in the allocated blocks collection or determining that the associated block identifier is not present in the allocated blocks collection comprises performing a depth-first search for the associated block identifier in the allocated blocks collection.

17. The method of claim 12, wherein determining that the associated block identifier is present in the allocated blocks collection or determining that the associated block identifier is not present in the allocated blocks collection comprises performing a breadth-first search for the associated block identifier in the allocated blocks collection.

18. The method of claim 12, wherein the allocated blocks collection and the reference anomaly blocks collection are implemented using a collection type that is thread-safe.

19. The method of claim 12 further comprising parsing the file system subsequently to evaluating the integrity and the parsing of the file system and parsing implementation.

* * * * *